(12) United States Patent
Yamamoto

(10) Patent No.: US 11,864,090 B2
(45) Date of Patent: Jan. 2, 2024

(54) COMMUNICATION SYSTEM, COMMUNICATION MANAGEMENT METHOD, AND NON-TRANSITORY RECORDING MEDIUM

(71) Applicant: Satoru Yamamoto, Kanagawa (JP)

(72) Inventor: Satoru Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 122 days.

(21) Appl. No.: 17/584,267

(22) Filed: Jan. 25, 2022

(65) Prior Publication Data
US 2022/0286945 A1 Sep. 8, 2022

(30) Foreign Application Priority Data
Mar. 2, 2021 (JP) .................................. 2021-032723

(51) Int. Cl.
H04W 48/14 (2009.01)
H04L 5/00 (2006.01)
H04W 48/04 (2009.01)

(52) U.S. Cl.
CPC ........... *H04W 48/14* (2013.01); *H04L 5/0048* (2013.01); *H04W 48/04* (2013.01)

(58) Field of Classification Search
CPC ....... H04W 48/04; H04W 48/14; H04W 4/06; H04W 88/04; H04W 48/18; H04W 48/20; H04W 48/00; H04W 36/00; H04W 72/00; H04W 72/04; H04L 5/00; H04L 67/141; H04L 67/143; H04L 47/12;
(Continued)

(56) References Cited

U.S. PATENT DOCUMENTS

| | | | |
|---|---|---|---|
| 8,225,110 B2 * | 7/2012 | Stahl | H04W 12/108 |
| | | | 713/193 |
| 8,825,005 B2 * | 9/2014 | Ando | H04L 63/107 |
| | | | 455/410 |

(Continued)

FOREIGN PATENT DOCUMENTS

| | | |
|---|---|---|
| JP | 2014-014187 | 1/2014 |
| JP | 2018-061201 | 4/2018 |

(Continued)

*Primary Examiner* — Man U Phan
(74) *Attorney, Agent, or Firm* — Duft & Bornsen, PC

(57) ABSTRACT

A communication system, a communication management method, and a non-transitory recording medium. The communication system communicates with an access source terminal connected to a first network, a communication apparatus and one or more access destination terminals each connected to a second network, the one or more access destination terminal being configured to provide a service by remote access, in response to a request from the access source terminal to use the service provided by the one or more access destination terminals, acquires access information including location information indicating location of the access source terminal and time information indicating usage time of the service, and restricts use of the service based on the access information and setting information, the setting information previously setting a range of the access information for permitting the use of the service provided by the one or more access destination terminals by the access source terminal.

10 Claims, 16 Drawing Sheets

(58) Field of Classification Search
CPC ............. H04L 47/1004; H04L 47/1027; H04L 37/146; H04L 67/566
USPC ........................................................ 370/329
See application file for complete search history.

(56) References Cited

U.S. PATENT DOCUMENTS

| | | | | |
|---|---|---|---|---|
| 8,856,818 | B2* | 10/2014 | Emerson | H04N 21/4753 |
| | | | | 725/25 |
| 9,414,307 | B2* | 8/2016 | Vrbaski | H04W 48/18 |
| 10,609,208 | B2* | 3/2020 | Skogen | G06F 11/3438 |
| 10,999,365 | B2* | 5/2021 | Watanabe | H04L 61/2517 |
| 11,005,986 | B2* | 5/2021 | Skogen | G06F 11/3438 |
| 11,075,877 | B2* | 7/2021 | Bleidorn | H04L 61/5014 |
| 11,641,341 | B2* | 5/2023 | Bleidorn | H04L 12/66 |
| | | | | 370/475 |
| 2010/0017889 | A1* | 1/2010 | Newstadt | H04L 63/102 |
| | | | | 709/224 |
| 2015/0135275 | A1* | 5/2015 | Matsugashita | H04L 63/10 |
| | | | | 726/4 |
| 2018/0103092 | A1 | 4/2018 | Watanabe et al. | |
| 2020/0037106 | A1* | 1/2020 | Shiotsu | H04W 4/14 |
| 2021/0266395 | A1* | 8/2021 | Skogen | H04L 63/10 |

FOREIGN PATENT DOCUMENTS

| | | | |
|---|---|---|---|
| JP | 2019-062495 | | 4/2019 |
| JP | 2019-220817 | | 12/2019 |

\* cited by examiner

FIG. 6A

| SERVICE | SYMBOL | URL |
|---|---|---|
| APPLICATION SERVICE | SRV_APP | HTTPS://APP.SRW.EXAMPLE.COM/ |
| RELAY SERVICE | SRV_R | HTTPS://RELAY.SRW.EXAMPLE.COM/ |
| PLATFORM SERVICE | PSV | HTTPS://PSV.EXAMPLE.COM/ |

| TENANT ID | TENANT NAME |
|---|---|
| T_20171384 | EXAMPLE CO, LTD. |
| T_51299351 | SOME COMPANY |

| TENANT ID | USER ID | USERNAME | DISPLAY NAME | PASSWORD (HASHED VALUE) |
|---|---|---|---|---|
| T_20171384 | U_30623016 | USER A | USER A | 427E170F76F81F7742E9DA100D71346AA6<br>31ACB3F9980A1A41680883C0654431 |
| T_20171384 | U_53293025 | USER B | USER B | 1095483201216758D686029CDDF1B1E1A<br>ABBF6DC107737E11EEC5652E1D31E1 |
| T_20171384 | U_32653303 | USER C | USER C | 6BC20F8892242A407D8F80B2F42A73D72<br>FB45A4363369C06D9A2E636C51299F6 |
| T_20171384 | U_06923601 | USER D | USER D | 6EAAD334709ADE01D4E0536E5251BB9D3<br>04A5080D6D73AF3F65CD8EFA59F6E84 |
| T_20171384 | U_03547150 | USER E | USER E | F7E737B470CA2A4FCDA09B933C34BB54<br>2B763DF3544175131 2A9B1FAEB5F4864 |
| T_51299351 | U_67527370 | USER F | USER F | D62BC66BEADBEDA27452E2EE2878F5477<br>61F82536A96701B7CF7C08C24AB107A |
| T_51299351 | U_60033333 | USER G | USER G | 6A24368381A506C59EE76265B05F2BDCE<br>248B77D14F5769EA9DFB67ED8000F21 |

| TENANT ID | USER GROUP ID | USER GROUP NAME | MEMBER LIST |
|---|---|---|---|
| T_20171384 | UG_20816657 | INFORMATION SYSTEM DEPARTMENT | U_30623016<br>U_53293025<br>UG_41656478<br>UG_12057081 |
| T_20171384 | UG_41656478 | PLANNING SECTION | U_32653303<br>U_06923601<br>U_03547150 |
| T_20171384 | UG_12057081 | OPERATION SECTION | U_55227158<br>U_97007332<br>U_38531663 |
| T_20171384 | UG_42783520 | SECURITY PROMOTION DEPARTMENT MANAGERS | U_66887594<br>U_21397419 |
| T_20171384 | UG_35619664 | SECURITY PROMOTION DEPARTMENT | U_66887594<br>U_21397419<br>U_47470111<br>U_23588820<br>U_11899101 |
| T_51299351 | UG_55772245 | MANAGEMENT | U_67527370<br>U_60033333 |

| TENANT ID | TYPE ID | TYPE NAME | CONVERSION PROGRAM |
|---|---|---|---|
| COMMON | T_84735099 | RDP | APP/COMMON/RDP |
| COMMON | T_48577944 | FAX | APP/COMMON/FAX |
| T_20171384 | T_17269900 | APPROVAL | APP/TENANT/T_20171384/APPROVAL |
| T_20171384 | T_46365658 | ATTENDANCE | APP/TENANT/T_20171384/ATTENDANCE |
| T_20171384 | T_34852650 | SMB | APP/TENANT/T_20171384/BOXLOG |
| T_51299351 | T_92833731 | HTTPS | APP/COMMON/HTTPS |

FIG. 8A

| TENANT ID | SERVICE ID | SERVICE NAME | TYPE | DESTINATION |
|---|---|---|---|---|
| T_20171384 | S_62375197 | INFORMATION SYSTEM DEPARTMENT COMMON PC | RDP | INFO-PC.INFO.EXAMPLE.CO.JP:3389/TCP |
| T_20171384 | S_90501454 | INFORMATION SYSTEM DEPARTMENT FACSIMILE | FAX | FAX.INFO.EXAMPLE.CO.JP:443/TCP |
| T_20171384 | S_89645095 | INFORMATION SYSTEM DEPARTMENT MANAGEMENT | HTTPS | MANAGEMENT.INFO.EXAMPLE.CO.JP:443/TCP |
| T_20171384 | S_74241930 | APPROVAL SYSTEM | APPROVAL | APPROVAL.EXAMPLE.CO.JP:443/TCP |
| T_20171384 | S_90716027 | ATTENDANCE SYSTEM | ATTENDANCE | ATTENDANCE.EXAMPLE.CO.JP:443/TCP |
| T_20171384 | S_89645095 | SECURITY PROMOTION DEPARTMENT INCIDENT MANAGEMENT | HTTPS | INCIDENT.SECURITY.EXAMPLE.CO.JP:443/TCP |
| T_20171384 | S_23984759 | LOG SERVER | SMB | BOXLOG.EXAMPLE.CO.JP:455/TCP |
| T_51299351 | S_98900543 | ACCOUNTING | HTTPS | ACCOUNTING.EXAMPLE.CO.UK:443/TCP |
| T_51299351 | S_51673407 | LOG SERVER | SMB | ACCOUNTOG.EXAMPLE.CO.JP:445/TCP |

| TENANT ID | SERVICE GROUP ID | SERVICE GROUP NAME | MEMBER LIST |
|---|---|---|---|
| T_20171384 | SG_29114097 | INFORMATION SYSTEM DEPARTMENT COMMON | S_62375197<br>S_90501454<br>SG_65031531 |
| T_20171384 | SG_65031531 | HEADQUARTERS SERVICE | S_74241930<br>S_90716027 |
| T_20171384 | SG_71576344 | SECURITY PROMOTION DEPARTMENT COMMON | S_61662551<br>SG_65031531 |
| T_20171384 | SG_61662551 | SPECIAL MISSION UNIT COMMON | SG_65031531 |
| T_51299351 | SG_84735099 | TOP MANAGEMENT | S_98900543 |

| TENANT ID | DEVICE ID | DEVICE NAME | AUTOMATIC UPDATE |
|---|---|---|---|
| T_20171384 | B_76052347 | INFORMATION CENTER | EFFECTIVE (SATURDAY AND SUNDAY, 03:00–04:00) |
| T_20171384 | B_39696039 | GENERAL AFFAIRS CENTER | EFFECTIVE (SATURDAY AND SUNDAY, 03:00–04:00) |
| T_20171384 | B_80734640 | SALES CENTER | EFFECTIVE (SATURDAY AND SUNDAY, 03:00–04:00) |
| T_51299351 | B_54519734 | HEADQUARTERS | NOT EFFECTIVE |
| ... | ... | ... | ... |

| TENANT ID | POLICY ID | POLICY NAME | PRIORITY | USER ID | SERVICE ID | ACTION ID |
|---|---|---|---|---|---|---|
| T_20171384 | P_63619389 | INFORMATION SYSTEM DEPARTMENT MANAGEMENT | 00000001 | U_30623016 U_53293025 U_32653303 | S_89645095 | A_64499849 |
| T_20171384 | P_10034703 | INFORMATION SYSTEM DEPARTMENT GENERAL | 00000002 | UG_20816657 | SG_29114097 | A_64499849 |
| T_20171384 | P_47089709 | SECURITY PROMOTION DEPARTMENT MANAGEMENT | 00000003 | UG_42783520 | S_89645095 | A_11030259 |
| ... | ... | ... | ... | ... | ... | ... |

| TENANT ID | ACTION ID | ACTION NAME | TIME CONDITION | LOCATION CONDITION | ACTION |
|---|---|---|---|---|---|
| COMMON | A_64499849 | PERMITTED | WEEKDAYS; 09:00 –17:00; | (35.459, 139.388, 1) | ACTION/COMMON/ACCEPT |
| COMMON | A_15440752 | REJECTED | ANYTIME | ANYWHERE | ACTION/COMMON/DENY |
| T_20171384 | A_11030259 | MULTI-FACTOR AUTHENTICATION | ANYTIME | ANYWHERE | ACTION/TENANT/T_20171384/MFA |
| ... | ... | ... | ... | ... | ... |

COMMUNICATION SYSTEM, COMMUNICATION MANAGEMENT METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-032723, filed on Mar. 2, 2021, in the Japan Patent Office, the entire disclosure of which is hereby incorporated by reference herein.

BACKGROUND

Technical Field

The present disclosure relates to a communication system, a communication management method, and a non-transitory recording medium.

Related Art

In recent years, due to work style reform and spread of working from home, there is an increasing need for remote access from an access source terminal connected to an external network to access various services provided by access destination terminals connected to a local network.

In a known technique, in response to a login by a user, an image forming apparatus sends login time and installation location information to a server, and the server restricts use of the image forming apparatus based on a result of comparison between the login time and the installation location, and a pre-registered working time and working place.

SUMMARY

Embodiments of the present disclosure describe a communication system, a communication management method, and a non-transitory recording medium. The communication system communicates with an access source terminal connected to a first network, a communication apparatus and one or more access destination terminals each connected to a second network, the one or more access destination terminal being configured to provide a service by remote access, in response to a request from the access source terminal to use the service provided by the one or more access destination terminals, acquires access information including location information indicating location of the access source terminal and time information indicating usage time of the service, and restricts use of the service based on the access information and setting information, the setting information previously setting a range of the access information for permitting the use of the service provided by the one or more access destination terminals by the access source terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 6A, 6B, and 6C are tables illustrating examples of information managed by the communication system according to embodiments of the present disclosure;

FIGS. 7A and 7B are tables illustrating examples of information managed by the communication system according to embodiments of the present disclosure;

FIGS. 8A, 8B, and 8C are tables illustrating examples of information managed by the communication system according to embodiments of the present disclosure;

FIGS. 9A and 9B are tables illustrating examples of information managed by the communication system according to embodiments of the present disclosure;

Figure 1:
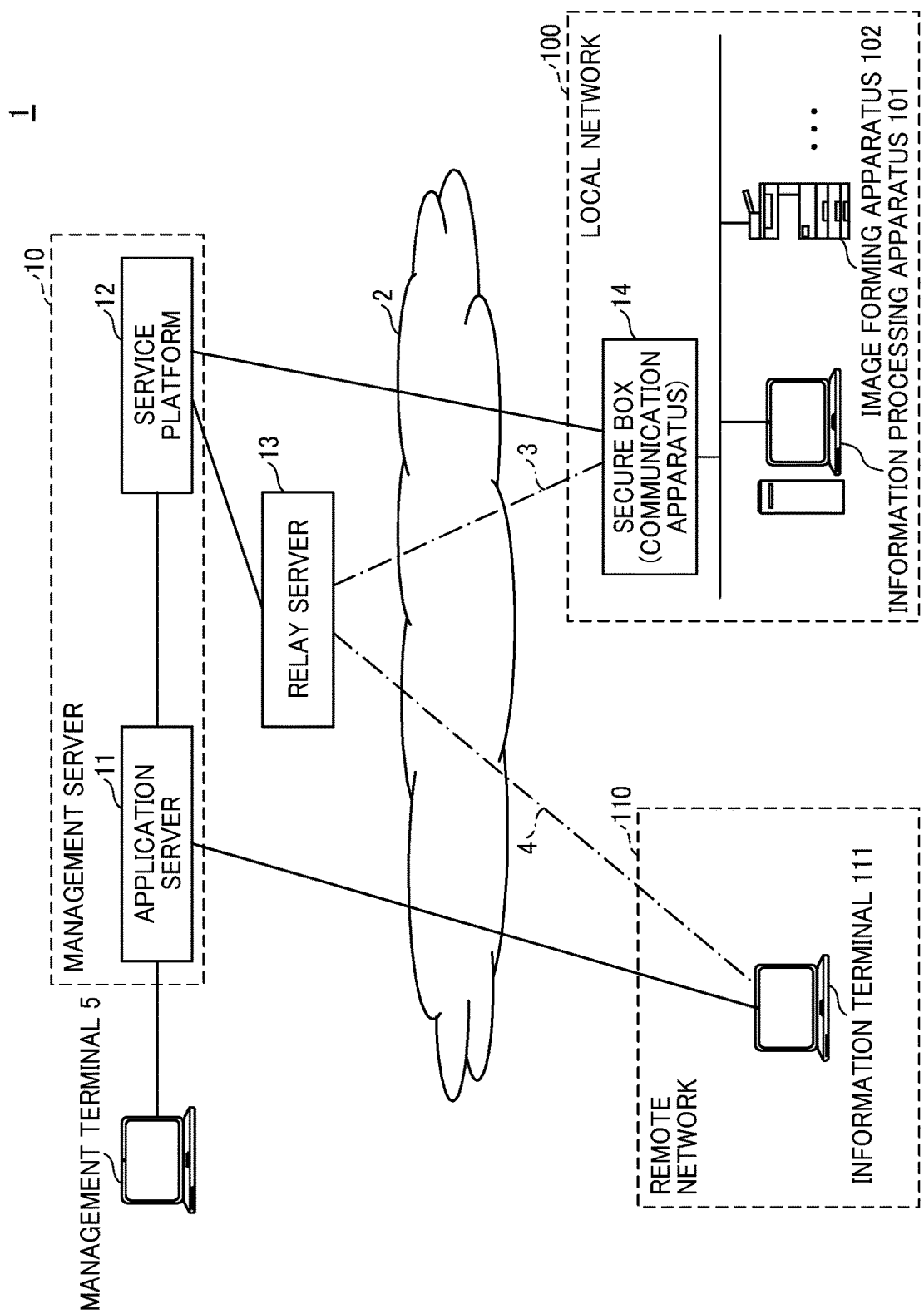
FIG. 1 is a block diagram illustrating an example of a system configuration of a communication system according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of several embodiments of the present disclosure with reference to drawings.

FIG. 1 is a block diagram illustrating an example of a system configuration of a communication system according to a first embodiment of the present disclosure. The communication system 1 includes, for example, an application server 11, a service platform 12, and a relay server 13 each connected to a communication network 2 such as the internet, and a secure box 14 connected to a local network 100. Further, the communication system 1 includes, for example, an information terminal 111 connected to an external network of the local network 100 such as a remote network 110 or the communication network 2. The communication system 1 is a system in which a service is provided by an access destination terminal connected to the local network 100 to the information terminal 111 connected to the external network through the secure box 14 connected to the local network 100.

The remote network (first network) 110 provided at, for example, home or a remote office, is an example of an external network (first network) different from the local network 100. The connection of the information terminal 111 is not limited to the remote network 110. The information terminal 111 may be connected, for example, to the communication network 2 such as the internet by using a wide area network (WAN), a public wireless local area network (LAN), or the like from outside. The communication network 2 is another example of an external network (first network) different from the local network 100. The following description is given as an example assuming that the information terminal 111 is connected to the remote network 110, which is the local network provided in the remote office or the like.

The information terminal (access source terminal) 111 is an information processing apparatus used by a user and includes a function of a web browser such as a personal computer (PC), a tablet terminal, or a smartphone. The information terminal 111 accesses the application server 11, the relay server 13, and the like through the remote network 110 and the communication network 2. The information terminal 111 is an example of an access source terminal connected to the first network.

The local network (second network) 100 is a network such as an in-house LAN whose access from an external network such as the communication network 2 or the remote network 110 is restricted by a firewall or the like. The local network 100 is an example of the second network different from the first network.

In FIG. 1, it is assumed that the service platform 12 and the secure box 14 are set in advance so as to be communicable by, for example, a communication protocol such as Message Queue Telemetry Transport (MQTT). Further, it is assumed that access from the information terminal 111, the relay server 13, and the like to the secure box 14, the information processing apparatus 101, the image forming apparatus 102, and the like in the local network 100 is prohibited.

The information processing apparatus (access destination terminal) 101 is an information processing apparatus such as the PC connected to the local network 100 and provides services such as a remote desktop service. The image forming apparatus (access destination terminal) 102 is an electronic device connected to the local network 100 and provides services such as a facsimile service.

The information processing apparatus 101 and the image forming apparatus 102 are examples of access destination terminals that are connected to the local network 100 and provide a specific service. The access destination terminal may be, for example, a projector (PJ), an interactive whiteboard (IWB: a whiteboard including an electronic whiteboard function capable of mutual communication), a digital signage, or the like. Further, the access destination terminal may be, for example, an industrial machine, an imaging device, a sound collecting device, a medical device, a network home appliance, a smartphone, a tablet terminal, a game machine, a personal digital assistant (PDA), a digital camera, or the like.

The application server 11 is, for example, an information processing apparatus having a configuration same as a computer or a system including a plurality of information processing apparatuses. The application server 11 uses, for example, the communication system 1 to provide the information terminal 111 with web contents or the like for using the access destination terminal such as the information processing apparatus 101 or the image forming apparatus 102 on the local network 100. Further, the application server 11 may include a function of providing a web page for setting the communication system 1 to, for example, a management terminal 5 or the like which is an information terminal used by an administrator or the like who manages the communication system 1.

The service platform 12 is, for example, the information processing apparatus having a configuration same as a computer or the system including the plurality of information processing apparatuses. The service platform 12 cooperates with the application server 11 to execute a device management process for managing the secure box 14 and the like. The service platform 12 also performs, for example, an authentication process and management of log information.

The relay server 13 is, for example, the information processing apparatus having a configuration same as a computer, or the system including the plurality of information processing apparatuses. The relay server 13 relays communication between the information terminal 111 and the secure box 14.

The functions of the application server 11 and the service platform 12 may be implemented by one management server 10 or may be implemented by more than one server. Further, the service platform 12 may be provided outside the management server 10 or may use a service outside the communication system 1. As described above, since the application server 11 and the service platform 12 can be configured as various systems, the application server 11 and the service platform 12 are not particularly distinguished in the following description and may be collectively referred to as the management server 10. Further, the management server 10 may further include the function of the relay server 13.

The secure box (communication apparatus) 14 is, for example, a communication apparatus or the information processing apparatus having a configuration same as the computer and a communication function. The secure box 14 connects to the relay server 13 under control of the management server 10 and controls remote access from the information terminal 111 to the access destination terminal (information processing apparatus 101 or image forming apparatus 102) connected to the local network 100. The secure box 14 is an example of a communication apparatus connected to the local network (second network) 100.

The management terminal 5 is an example of the information terminal including the function of the web browser and used by, for example, the administrator (system administrator or the like) who manages the communication system 1, or the administrator (manager or the like) who manages the user that uses the information terminal 111 by using the communication system 1.

In the above system configuration, the information terminal 111 can be connected to the communication network 2 from the remote network 110 but cannot access the information processing apparatus 101 or the image forming apparatus 102 each connected to the local network 100.

Conventionally, in such a case, in order to communicate from the information terminal 111 to the access destination terminal connected to the local network 100, the communication is encrypted by, for example, a virtual private network (VPN) or the like.

For example, Internet Protocol Security (IPsec) or the like is known as a method for connecting by VPN, the information terminal 111 connected to the remote network 110 to the access destination terminal connected to the local network 100. In case of using this method, the administrator or the like needs to appropriately set network settings such as router routing settings and firewall access control list settings so that communication by IPsec works correctly.

In the present embodiment, the secure box 14 for encrypted communication with the management server 10 is installed on the local network 100, and encrypted communication is performed between the information terminal 111 and the access destination terminal through the management server 10 and the secure box 14. As a result, the user who uses the information terminal 111 can securely communicate with the access destination terminal connected to the local network 100 with a simple setting.

In the above system configuration, the user who uses the information terminal 111 may use, for example, the remote desktop service provided by the information processing apparatus 101 by accessing a web page provided by the application server 11 using the web browser or the like. By selecting the service to be used from this web page, the user requests connection to, for example, the remote desktop service provided by the information processing apparatus 101 (or the facsimile service provided by the image forming apparatus 102). A request for this connection includes, for example, location information indicating the location of the information terminal 111. The user may use, for example, an application program for communication system 1 (hereinafter referred to as an application) having the function of web browser to access the web page instead of using the web browser installed on the information terminal 111.

When the application server 11 receives a connection request from the information terminal 111, the application server 11 acquires access information including the location information included in the connection request and time information indicating the time when the request is received. Further, the application server 11 restricts the use of the service by the information terminal 111 based on the acquired access information and the setting information in which a range of the access information for per use of the service requested by the information terminal 111 is set in advance. For example, when the acquired location information is outside the range of the location condition set in the setting information, or, when the acquired time information is outside the range of the time condition set in the setting information, the application server 11 restricts the use of the service by the information terminal 111 (for example, refuse the use).

Preferably, in the above-mentioned setting information, the range of access information to permit use of the service is set for each service provided by one or more access destination terminals (for example, the information processing apparatus 101, the image forming device, or the like). According to the present embodiment, in the communication system 1 in which a mobile access source terminal (information terminal 111) remotely accesses one or more access destination terminals to use various services, the use of each service can be appropriately restricted.

On the other hand, the application server 11 permits the use of the service by the information terminal 111 and executes the connection process when the acquired location information is within the range of the location condition set in the setting information and when the acquired time information is within the time condition set in the setting information. For example, the application server 11 generates (issues) a session ID, which is identification information for identifying a session. Further, the application server 11 uses the service platform 12 to notify the secure box 14 of the generated session ID, requesting a connection to the relay server 13, and at the same time, notifies the requesting information terminal 111 of the session ID.

The secure box 14 connects to the relay server 13 by first encrypted communication 3 using the notified session ID according to the request from the management server 10. For example, the secure box 14 establishes a session with the relay server 13 in the first encrypted communication 3 using Web Socket over Hypertext Transfer Protocol Secure (wws).

Further, the information terminal 111 connects to the relay server 13 by second encrypted communication 4 by using the session ID notified by the management server 10. For example, the information terminal 111 establishes a session with the relay server 13 in the second encrypted communication 4 using wws.

The relay server 13 causes the information terminal 111 and the secure box 14, which have established a session with the relay server 13 using the same session ID (identification information), to participate in the same session and relays the communication between the information terminal 111 and the secure box 14. For example, the relay server 13 connects the information terminal 111 and the secure box 14 and enables communication by tunneling the first encrypted communication 3 and the second encrypted communication 4. Further, the secure box 14 includes a protocol conversion function for allowing the web browser of the information terminal 111 to use, for example, a remote desktop service provided by the information processing apparatus 101 connected to the local network.

For example, the secure box 14 converts the remote desktop screen in Remote Desktop Protocol (RDP) format, obtained from the remote desktop service provided by the information processing apparatus 101, into image data in a format that can be displayed by the web browser of the information terminal 111. Further, the secure box 14 converts the operation information of wws received from the information terminal 111 into the operation information in the RDP format and transmits the converted operation information to the remote desktop service.

By the above processing, the information terminal 111 can easily use the remote desktop service provided by the information processing apparatus 101 connected to the local network 100 without performing complicated work such as changing the network configuration.

Preferably, the application server 11 periodically acquires access information including the location information and time information of the information terminal 111 while the information terminal 111 is communicating with the information processing apparatus 101. Further, the application server 11 restricts the use of the service by the information terminal 111 by using the acquired access information and the setting information in which the range of the access information for permitting the use of service by the information terminal 111 is set in advance.

By the above processing, according to the present embodiment, in the communication system 1 in which the mobile access source terminal (information terminal 111) uses various services provided by the access destination terminal, the use of each service can be appropriately restricted.

The system configuration of the communication system 1 illustrated in FIG. 1 is an example. For example, in the example of FIG. 1, the local network 100 is connected to the communication network 2 through the secure box 14. In another example, the local network 100 may be connected to the communication network 2 through a router, a firewall, or the like. In this case, the secure box 14 communicates with the service platform 12 and the relay server through the router and the firewall.

Further, the secure box 14 is an example of the communication apparatus connected to the local network 100. The communication apparatus may be, for example, a server including a communication function and executing a program. Further, the communication network 2 may include a section connected by wireless communication such as mobile communication or wireless LAN.

Figure 2:
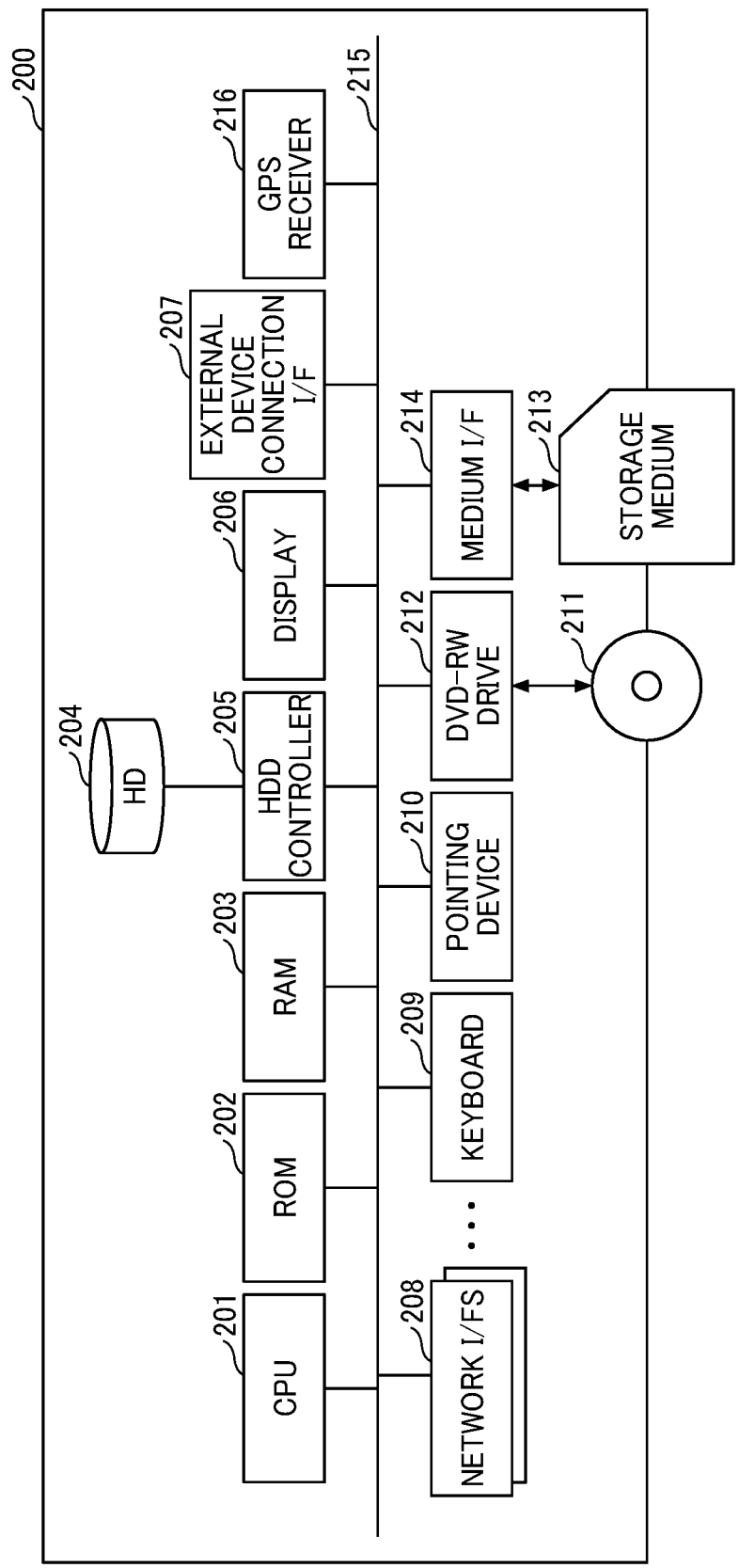
FIG. 2 is a block diagram illustrating an example of a hardware configuration of a computer according to embodiments of the present disclosure.

The information terminal 111, the information processing apparatus 101, and the management terminal 5 each have, for example, a hardware configuration of the computer 200 as illustrated in FIG. 2. Further, the application server 11, the service platform 12, the relay server 13, and the management server 10 each are implemented by one or more computers 200.

FIG. 2 is a block diagram illustrating an example of the hardware configuration of the computer according to the present embodiment. The computer 200 includes, for example, a central processing unit (CPU) 201, a read only memory (ROM) 202, a random access memory (RAM) 203, a hard disk (HD) 204, a hard disk drive (HDD) controller 205, a display 206, an external device connection interface (I/F) 207, one or more network I/Fs 208, a keyboard 209, a pointing device 210, a digital versatile disc rewritable (DVD-RW) drive 212, a medium I/F 214, a bus line 215, and the like as illustrated in FIG. 2. Further, when the computer 200 is the access source terminal such as the information terminal 111, the computer 200 may further include a Global Positioning System (GPS) receiver 216.

The CPU 201 controls entire operation of the computer 200. The ROM 202 stores a program used for activating the computer 200, such as an initial program loader (IPL). The RAM 203 is used as, for example, a work area for the CPU 201. The HD 204 stores, for example, programs such as an operating system (OS), an application, and a device driver, and various data. The HDD controller 205 controls, for example, reading or writing of various data to and from the HD 204 under control of the CPU 201.

The display 206 displays various information such as a cursor, menu, window, character, or image. The display 206 may be provided outside the computer 200. The external device connection I/F 207 is an interface such as Universal Serial Bus (USB) or Recommended Standard (RS)-232C for connecting various external devices such as an electronic device, a measuring instrument, and an external storage device to the computer 200. One or more network I/Fs 208 are interfaces for data communication using, for example, the communication network 2, the local network 100, the remote network 110, or the like.

The keyboard 209 is an example of an input device provided with a plurality of keys for allowing the user to input characters, numerals, or various instructions. The pointing device 210 is an example of the input device that allows the user to select or execute a specific instruction, select a target for processing, or move the cursor being displayed. The keyboard 209 and the pointing device 210 may be provided outside the computer 200.

The DVD-RW drive 212 reads and writes various data from and to a DVD-RW 211, which is an example of a removable storage medium. The DVD-RW 211 is not limited to the DVD-RW and may be a digital versatile disc recordable (DVD-R) or the like. The medium I/F 214 controls reading or writing (storage) of data from and to a storage medium 213 such as a flash memory.

The GPS receiver 216 is a positioning device that receives a positioning signal transmitted by a GPS satellite and outputs location information such as latitude, longitude, and height, for example. The bus line 215 includes an address bus, a data bus, various control signals, and the like for electrically connecting each of the above components.

The configuration of the computer 200 illustrated in FIG. 2 is an example. The computer 200 may have any other configuration as long as the computer includes, for example, the CPU 201, the ROM 202, the RAM 203, one or more network I/Fs 208, and the bus line 215. Further, for example, the hardware configuration of the access destination terminal such as the image forming apparatus 102 may be any other configuration as long as the communication function and the basic function of the computer are included.

The functional configurations of each device and the server related to the communication system 1 is described.

Figure 3:
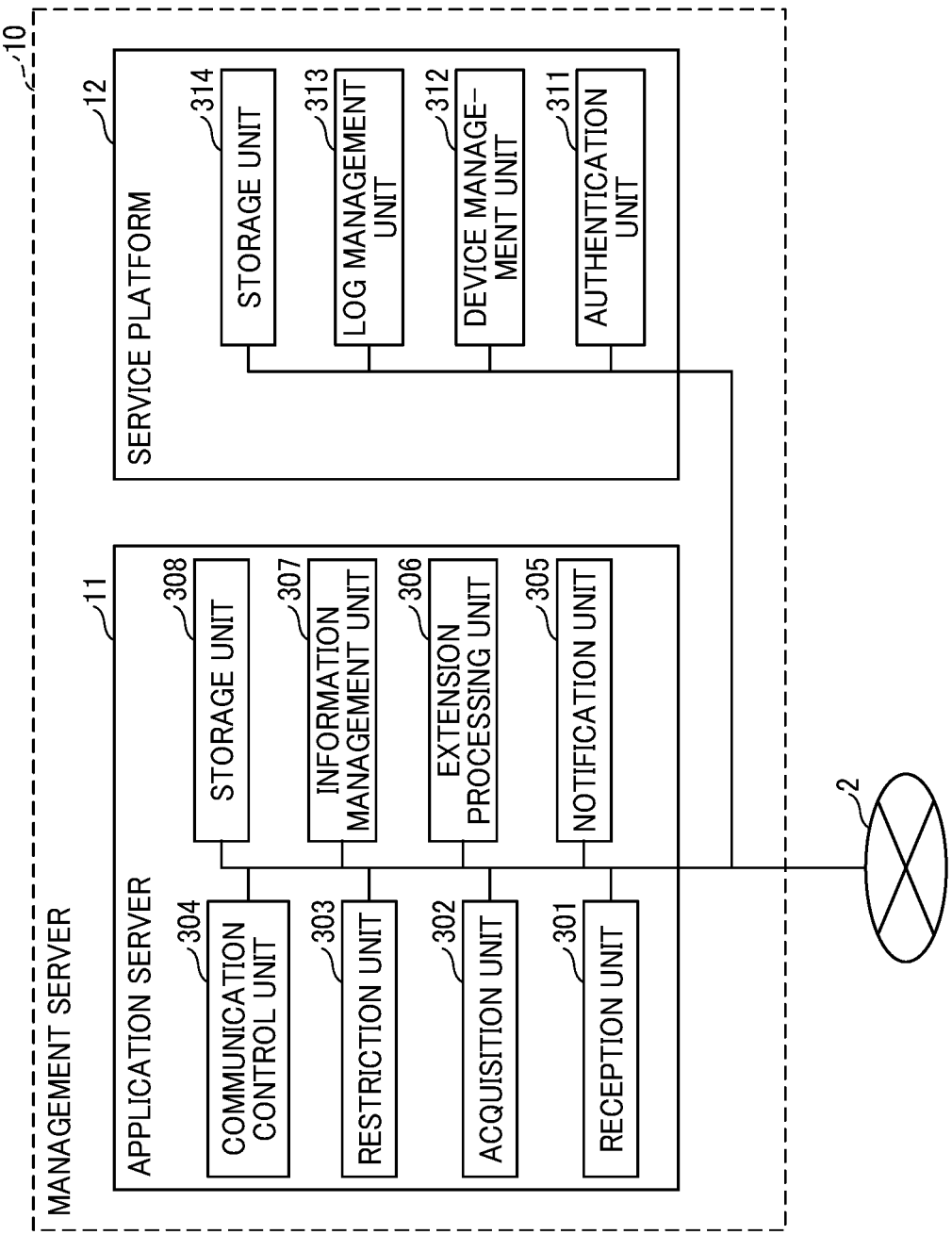
FIG. 3 is a block diagram illustrating a functional configuration of a management server according to embodiments of the present disclosure.

FIG. 3 is a block diagram illustrating a functional configuration of the management server according to embodiments of the present disclosure. The management server 10 executes, for example, a program on one or more computers 200 to implement a reception unit 301, an acquisition unit 302, a restriction unit 303, a communication control unit 304, a notification unit 305, an extension processing unit 306, an information management unit 307, a storage unit 308, an authentication unit 311, a device management unit 312, a log management unit 313, a storage unit 314, and the like. Note that at least a part of the above functional units may be implemented by hardware.

The reception unit 301 is implemented by, for example, a program executed by the CPU 201 included in the application server 11 and executes a reception process for receiving various request information such as the connection request from the information terminal 111 or the setting request from the management terminal 5. For example, the reception unit 301 functions as a web server that provides web contents such as a Web user interface (UI) for using the service provided by the management server 10.

The acquisition unit 302 is implemented by, for example, a program executed by the CPU 201 or the like included in the application server 11. The acquisition unit 302, for example, acquires the access information including the location information indicating the location of the access source terminal or the time information indicating the usage time when the access source terminal such as the information terminal 111 uses a service provided by the access destination terminal.

Preferably, the acquisition unit 302 acquires the access information including the location information indicating the location of the access source terminal or time information indicating the usage time, when the access source terminal starts using the service (when a connection is requested, etc.), or while the access source terminal is using the service (during communication, etc.).

Preferably, the acquisition unit 302 acquires the location information of the access source terminal from the access source terminal and acquires the time information on which the access source terminal uses the service from the management server 10. As a result, modification of the time information by the access source terminal can be prevented.

The restriction unit 303 is implemented by, for example, a program executed by the CPU 201 or the like included in the application server 11. The restriction unit 303 restricts the use of services by the access source terminal using the access information acquired by the acquisition unit 302 and the setting information in which the range of access information to permit the use of service provided by the access destination terminal is set in advance.

For example, the administrator or the like stores in the storage unit 308 of the application server 11, the setting information indicating the range of access information in which the access source terminal (or the user who uses the access source terminal) can use the service provided by the access destination terminal is set in advance. In this setting information, for example, for each service provided by one or more access destinations, the range of location information, the range of time information, and the like in which the access source terminal can use the service can be set.

Further, when a part or all of the access information acquired by the acquisition unit 302 is outside the range of the access information set in the setting information, the restriction unit 303 restricts the use of the service by the access source terminal. For example, the restriction unit 303 restricts the use of the service by the access source terminal when the location information included in the access information acquired by the acquisition unit 302 is outside the range of the location information set in the setting information (for example, refuse to use, or disconnect communication within a specified time, etc.). Similarly, when the time information included in the access information acquired by the acquisition unit 302 is outside the range of the time information set in the setting information, the restriction unit 303 restricts the use of the service by the access source terminal.

The communication control unit 304 is implemented by, for example, a program executed by the CPU 201 or the like included in the application server 11. The communication control unit 304 manages the communication (session) between the access source terminal such as the information terminal 111 and the secure box 14 by using the session ID.

The notification unit 305 is implemented by, for example, a program executed by the CPU 201 or the like included in the application server 11. The notification unit 305 notifies the user who uses the access source terminal that the use of the service is restricted, when the access source terminal such as the information terminal 111 is using the service and when the restriction unit 303 restricts the use of the service by the access source terminal. For example, the notification unit 305 may display a message indicating that the communication is disconnected within a certain time, a disconnection notice screen, or the like on the access source terminal, or may use an e-mail, chat, or short message service (SMS) or the like to notify the user.

The extension processing unit 306 is implemented by, for example, a program executed by the CPU 201 or the like included in the application server 11. The extension processing unit 306 notifies the user that an application of the usage time is required when the access source terminal such as the information terminal 111 is using the service, and when the time information of the terminal is out of the range of the time information (time condition) set in the setting information. Further, in response to the application for extension of the usage time by the user, the extension processing unit 306 executes an extension process for extending the time during which the access source terminal can use the service.

The information management unit 307 is implemented by, for example, a program executed by the CPU 201 or the like included in the application server 11, and various information managed by the communication system 1 is stored in the storage unit 308 or the like.

The storage unit 308 is implemented by, for example, a program executed by the CPU 201 or the like included in the application server 11, the HD 204, the HDD controller 205, or the like, and stores various information managed by the communication system 1. Examples of the information managed by the communication system 1 are described below.

The authentication unit 311 is implemented by, for example, a program executed by the CPU 201 or the like included in the service platform 12. The authentication unit 311 executes an authentication process for authenticating, for example, the user who uses the information terminal 111, the administrator who uses the management terminal 5, the information terminal 111, the secure box 14, and the like. The communication system 1 may use for example, an external authentication server or the like for authentication.

The device management unit 312 executes, for example, a device management process for managing the communication apparatus such as the secure box 14 connected to the local network 100, which is implemented by a program executed by the CPU 201 or the like included in the service platform 12. For example, the device management unit 312 establishes communication (for example, constant connection by MQTT) between the secure box 14 and the management server 10 in response to a request from the secure box 14 connected to the local network 100. Further, when the reception unit 301 receives the connection request from the information terminal 111, the device management unit 312 notifies the secure box 14 of the session ID generated by the reception unit 301 and requests to connect to the relay server 13. Further, each functional unit included in the management server 10 can communicate with the secure box 14 by using the device management unit 312.

The log management unit 313 is implemented by, for example, a program executed by the CPU 201 or the like included in the service platform 12. The log management unit 313 stores and manages in the storage unit 314 of the service platform 12, the log information transmitted by, for example, the application server 11, the service platform 12, the relay server 13, the secure box 14, or the like included in the communication system 1.

The storage unit 314 is implemented by, for example, a program executed by the CPU 201 or the like included in the service platform 12, the HD 204, the HDD controller 205, or the like, and stores the log information managed by the log management unit 313, the user information used by the authentication unit 311 and the like.

The functional configuration of the management server 10 illustrated in FIG. 3 is an example. Each functional configuration included in the management server 10 can be implemented by a program executed by any computer 200 included in the management server 10. Further, the relay server 13 may be provided inside the management server 10.

Further, the authentication unit 311 and the storage units 308, 314 and the like may be implemented by the management server 10 or an external server of the communication system 1.

Figure 4:
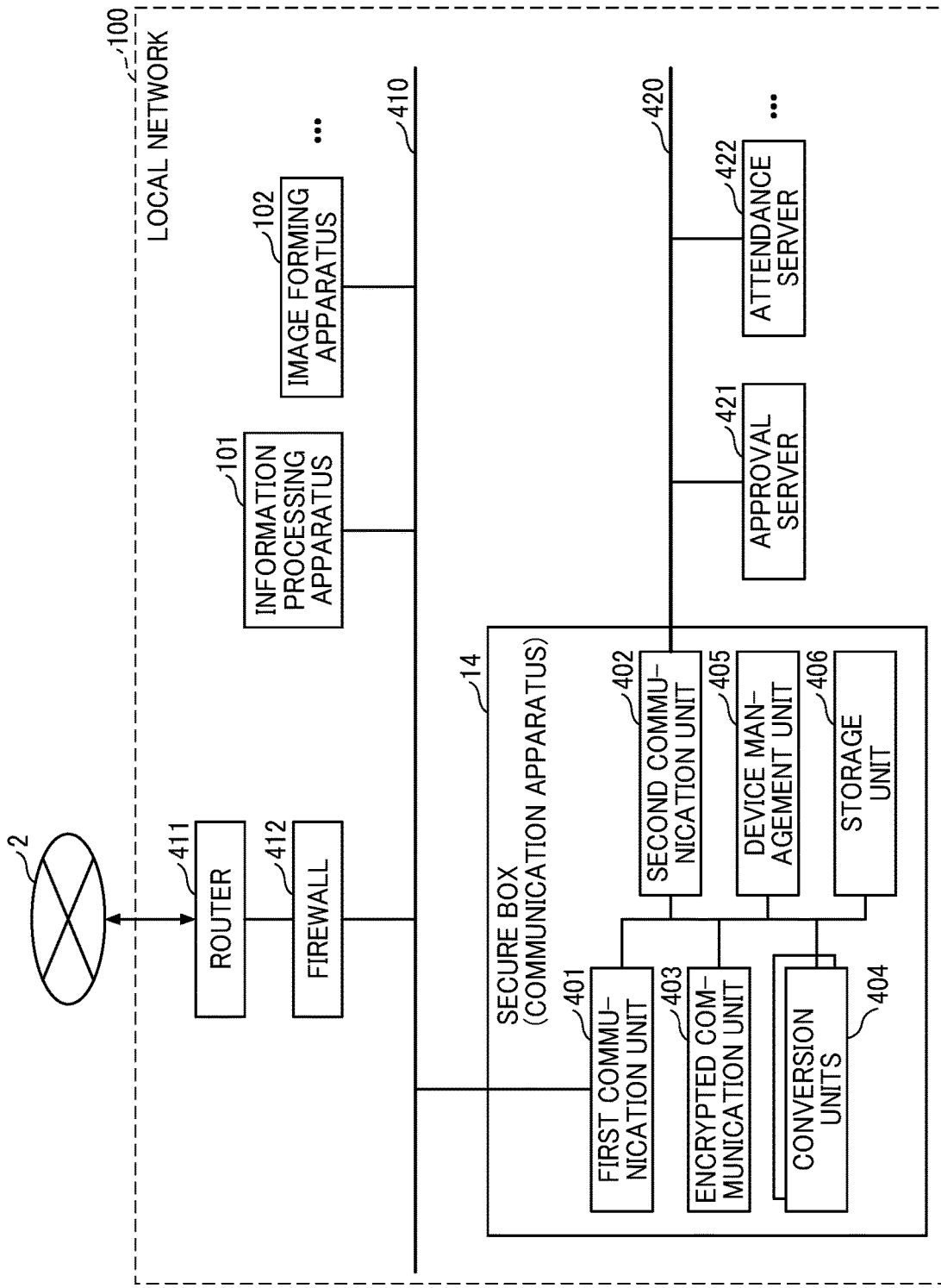
FIG. 4 is a block diagram illustrating a functional configuration of a secure box according to embodiments of the present disclosure.

FIG. 4 is a block diagram illustrating a functional configuration of the secure box according to embodiments of the present disclosure. Before describing the functional configuration of the secure box 14, an outline of an example of the local network 100 is described. In the example of FIG. 4, the local network 100 includes a first local network 410 connected to the communication network 2 through a router 411 and a firewall 412. Further, the local network 100 may include a second local network 420 connected to the first local network 410 through the secure box 14.

In the example of FIG. 4, the secure box 14, the information processing apparatus 101, the image forming apparatus 102, and the like are connected to the first local network 410. Further, in addition to the information processing apparatus 101 and the image forming apparatus 102, various information processing devices, electronic devices, or systems may be connected to the first local network 410.

Further, for example, an approval server 421 that provides an approval service dedicated to a tenant, an attendance server 422 that provides an attendance management service dedicated to the tenant, and the like are connected to the second local network 420.

A description is now given of a functional configuration of the secure box 14. The secure box 14 is an example of the communication apparatus connected to the second network different from the first network.

The secure box 14 includes, for example, a first communication unit 401, a second communication unit 402, an encrypted communication unit 403, one or more conversion units 404, a device management unit 405, the storage unit 406, and the like, which are implemented by executing a program on the computer 200 included in the secure box 14. Note that at least a part of the above functional units may be implemented by hardware.

The first communication unit 401 connects the secure box 14 to the first local network 410 by using, for example, the network I/F 208 or the like, and executes a first communication process for communicating with another device.

The second communication unit 402 connects the second local network 420 to the secure box 14, using the network I/F 208 different from the network I/F 208 of the first communication unit 401, and executes a second communication process to communicate with, for example, the approval server 421, the attendance server 422, and the like. The approval server 421 and the attendance server 422 are other examples of access destination terminals.

The encrypted communication unit 403 executes an encrypted communication process for establishing a session with the relay server 13 in the first encrypted communication 3 by using, for example, the session ID notified from the management server 10.

One or more conversion units 404 execute conversion process for mutual protocol conversion between the protocol used by the access source terminal and the protocol used by the access destination terminal. For example, each of one or more conversion units 404 includes a conversion unit 404 that mutually converts between the wss protocol used by the information terminal 111 and the RDP protocol used by the information processing apparatus 101 of the access destination. Further, each of one or more conversion units 404 includes a different conversion unit 404 that mutually converts between the wss protocol used by the information terminal 111 and the Web application programming interface (API) for using the facsimile service provided by the image forming apparatus 102. The Web API for using the facsimile service provided by the image forming apparatus 102 is an example of the protocol used by the access destination terminal according to the present embodiment.

The device management unit 405 performs processing of the entire secure box 14, such as activation processing of the secure box 14. Further, the device management unit 405 stores and manages the setting information of the secure box 14 set from the management server 10 or the like in the storage unit 406 or the like.

The storage unit 406 is implemented by, for example, a program executed by the CPU 201 or the like included in the secure box 14, the HD 204, the HDD controller 205, or the like, and stores various information including the setting information of the secure box 14.

The functional configuration of the secure box 14 may be implemented by, for example, a program executed by a server or the like connected to the first local network 410.

Figure 5A:
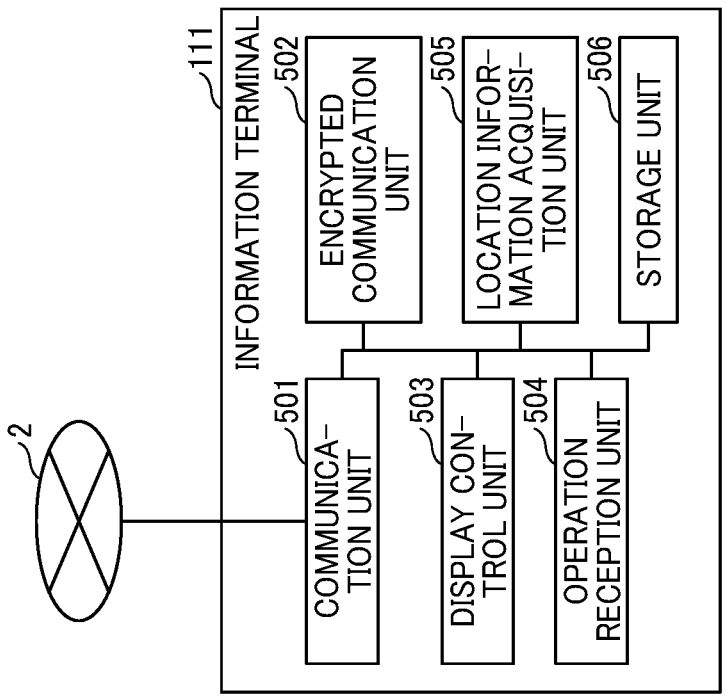
FIGS. 5A and 5B are block diagrams illustrating functional configurations of an information terminal and a relay server according to embodiments of the present disclosure.
Figure 5B:
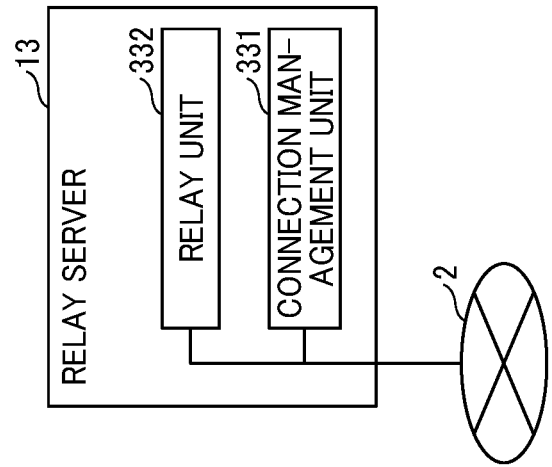

FIGS. 5A and 5B are block diagrams illustrating functional configurations of the information terminal 111 and the relay server 13 according to embodiments of the present disclosure. FIG. 5A illustrates an example of the functional configuration of the information terminal 111. The information terminal 111 includes, for example, a communication unit 501, an encrypted communication unit 502, a display control unit 503, an operation reception unit 504, a location information acquisition unit 505, a storage unit 506, and the like, each implemented by executing a program on the CPU 201 included in the information terminal 111. Note that at least a part of the above functional units may be implemented by hardware.

The communication unit 501 is implemented by, for example, the OS executed by the CPU 201, and uses the network I/F 208 to connect the information terminal 111 to the communication network 2, the remote network 110, or the like, and executes the communication process to communicates with other devices.

The encrypted communication unit 502 is implemented by, for example, the web browser, the application, the OS, or the like executed by the CPU 201 and establishes a session with the relay server 13 in the second encrypted communication 4 using the session ID notified from the management server 10.

The display control unit 503 is implemented by, for example, the web browser executed by the computer 200 and displays a display screen (Web UI, HyperText Markup Language (HTML) screen, etc.) transmitted from the management server 10, the secure box 14, or the like. The display control unit 503 also controls reproduction of audio when the display screen includes audio data or the like.

The operation reception unit 504 is implemented by, for example, the web browser executed by the computer 200, and receives an operation by the user (or the administrator) or the like on the display screen displayed by the display control unit 503.

The location information acquisition unit 505 is implemented by, for example, a program executed by the computer 200, the GPS receiver 216, or the like, and acquires location information (for example, latitude, longitude, etc.) indicating the location of the information terminal 111. When the information terminal 111 does not include the GPS receiver 216, the location information acquisition unit 505 may acquire the location information of the information terminal 111 using a geolocation service or the like that determines location information from an Internet Protocol (IP) address or a wireless LAN service set identifier (SSID) or the like.

The storage unit 506 is implemented by, for example, a program executed by the CPU 201, the HD 204, the HDD controller 205, or the like, and stores various information or data.

The management terminal 5 is a computer 200 including a general web browser. For example, the management terminal 5 has a functional configuration similar to that of the information terminal 111 illustrated in FIG. 5A, or a functional configuration in which the encrypted communication unit 502 is omitted from the functional configuration of the information terminal 111.

FIG. 5B illustrates an example of the functional configuration of the relay server 13. The relay server 13 includes a connection management unit 331, a relay unit 332, and the like, for example, by executing a program on the CPU 201 included in the relay server 13.

The connection management unit 331 executes, for example, a connection process relating to a session in which the first encrypted communication 3 is performed with the secure box 14 and a session in which the second encrypted communication 4 is performed with the information terminal 111.

The relay unit 332 relays the communication between the access source information terminal 111 and the secure box (communication apparatus) 14. For example, the relay unit 332 relays between the first encrypted communication 3 and the second encrypted communication 4 by establishing a tunnel between the first encrypted communication 3 established with the secure box 14 and the second encrypted communication 4 established with the information terminal 111 using the same session ID.

FIGS. 6A to 9B are tables illustrating examples of information managed by the communication system 1 according to embodiments of the present disclosure. FIG. 6A illustrates an example of a service uniform resource locator (URL) list 601 managed by the communication system 1. Each device included in the communication system 1 stores URL information for connecting to the access destination device in, for example, the service URL list 601 as illustrated in FIG. 6A.

FIG. 6B illustrates an example of a tenant list 602 managed by the communication system 1. The management server 10 stores and manages the tenant list 602, for example, as illustrated in FIG. 6B in a storage unit 314 (or a storage unit 308) or the like. In the example of FIG. 6B, the tenant list 602 includes information such as a tenant ID and a tenant name. The tenant ID is, for example, identification information that identifies a tenant that is a contract unit such as a company, an organization, a party, or a group. The tenant name is information indicating the name and the like of the tenant.

FIG. 6C illustrates an example of a user list 603 managed by the communication system 1. The management server 10 stores and manages the user list 603, for example, as illustrated in FIG. 6C in a storage unit 314 (or a storage unit 308) or the like. In the example of FIG. 6C, the user list 603 includes information such as the tenant ID, a user ID, a username, a display name, and a password (hashed value). The user ID is the identification information that identifies the user registered in the communication system 1. The username is information indicating the name and the like of the user. The display name is the name of the user displayed on a screen. The password (hashed value) is an example of authentication information for authenticating the user. The authentication information for authenticating the user may be, for example, authentication information other than the password such as a digital certificate.

The authentication unit 311 of the management server 10 authenticates the user who logs in to the management server 10 by, for example, using the user list 603 as illustrated in FIG. 6C.

FIG. 7A illustrates an example of a user group list 701 managed by the communication system 1. The management server 10 stores and manages, for example, the user group list 701 as illustrated in FIG. 7A in a storage unit 314 (or a storage unit 308) or the like. In the example of FIG. 7A, the user group list 701 includes information such as the tenant ID, a user group ID, a user group name, and a member list. The user group ID is identification information that identifies a user group in which users are grouped. The user group name is information indicating the name and the like of the user group. The member list stores the user IDs of one or more users who belong to the user group.

FIG. 7B illustrates an example of a type list 702 managed by the communication system 1. The management server 10 stores and manages the type list 702, for example, as illustrated in FIG. 7B in a storage unit 308 (or a storage unit 314) or the like. In the example of FIG. 7B, the type list 702 includes information such as the tenant ID, a type ID, a type name, and a conversion program. The type ID is identification information that identifies the type of conversion program. The type name is information indicating the name and the like of the type of the conversion program. The conversion program includes, for example, a conversion program common to each tenant (common) and a conversion program dedicated to each tenant (tenant). The conversion program is, for example, a program for implementing each of the one or more conversion units 404 in FIG. 4.

FIG. 8A illustrates an example of a service list 801 managed by the communication system 1. The management server 10 stores and manages the service list 801, for example, as illustrated in FIG. 8A in a storage unit 308 (or a storage unit 314) or the like. In the example of FIG. 8A, the service list 801 includes information such as the tenant ID, a service ID, a service name, a type, and a destination. The service ID is identification information that identifies a service provided by one or more access destination terminals. The service name is information indicating the name and the like of the service.

The type is information indicating the type of service. The destination is information indicating the destination of the access destination terminal to provide the service. The destination may be the IP address, a Fully Qualified Domain Name (FQDN), or the like.

FIG. 8B illustrates an example of the service group list 802 managed by the communication system 1. The management server 10 stores and manages the service group list 802, for example, as illustrated in FIG. 8B in the storage unit 308 (or the storage unit 314) or the like. In the example of FIG. 8B, the service group list 802 includes information such as the tenant ID, a service group ID, a service group name, and a member list.

The service group ID is identification information that identifies a service group in which services are grouped. The service group name is information indicating the name and the like of the service group. The service ID and the like of the services included in the service group are stored in the member list.

FIG. 8C illustrates an example of the secure box list 803 managed by the communication system 1. The management server 10 stores and manages the secure box list 803, for example, as illustrated in FIG. 8C in the storage unit 308 (or the storage unit 314) or the like. In the example of FIG. 8C, the secure box list 803 includes information such as the tenant ID, a device ID, a device name, and automatic update. The device ID is identification information that identifies the secure box 14. The device name is information indicating the name and the like of the secure box 14. The automatic update is an example of setting information indicating whether the automatic update of the setting information of the secure box 14 is effective, and the update timing when the automatic update is effective.

FIG. 9A illustrates an example of a policy list 901 managed by the communication system 1. The management server 10 stores and manages the policy list 901, for example, as illustrated in FIG. 9A in the storage unit 308 (or the storage unit 314) or the like. In the example of FIG. 9A, the policy list 901 includes information such as the tenant ID, a policy ID, a policy name, a priority, a user ID, a service ID, and an action ID. The policy ID is identification information for identifying the tenant. The policy name is information indicating the name of the policy.

The priority is information indicating the priority of the policy. In the user ID, the user ID of the user (or user group ID of the user group) corresponding to each policy is stored. The service ID of the service (or service group ID of the service group) corresponding to each policy is stored in the service ID. The action ID stores identification information that identifies the action corresponding to each policy.

FIG. 9B illustrates an example of an action list 902 managed by the communication system 1. The management server 10 stores and manages the action list 902, for example, as illustrated in FIG. 9B in the storage unit 308 or the like. In the example of FIG. 9B, the action list 902 includes information such as the tenant ID, an action ID, an action name, a time condition, a location condition, and an action. The action ID is identification information that identifies the action. The action name is information indicating the name or the like of the action.

The time condition is information indicating a range of time information in which each action can be executed. For example, the time condition "ANYTIME" indicates that the action can be executed at any time. As another example, the time condition "WEEKDAYS; 09:00-17:00" indicates that the action can be executed from 9:00 to 17:00 on weekdays.

The location condition is information indicating the range of location information in which each action can be executed. For example, the location condition "ANYWHERE" indicates that the action can be executed anywhere. As another example, the location information "(35.459, 139.388, 1)" indicates that the action can be executed within a range including a radius of "1" (about 30 m) centered on coordinates (35.459, 139.388). The action defines, for example, execution contents such as permit, reject, or perform multi-factor authentication.

Based on the policy list 901, the management server 10 perform the action corresponding to the action ID when the user ID (or user group ID) of the user who uses the service matches the service ID (or service group ID) of the service. Further, when the location information and the time information of the information terminal 111 used by the user are outside the range of the time condition and the location condition defined in the action list 902, the restriction unit 303 of the management server 10 restricts the use of service (execution of action) by the user.

The policy list 901 and the action list 902 are examples of the setting information in which the range of access information (time condition, location condition, etc.) in which the service provided by the access destination terminal can be used from the access source terminal is set in advance. With such setting information, in the communication system 1, the range of access information to permit the use of service can be set for each service provided by the access destination terminal.

A process of the communication management method according to the present embodiment is described in the following.

In a first embodiment, an example of process when the user uses the information terminal 111, which is an example of the access source terminal, and starts to use the remote desktop service provided by the information processing apparatus 101, which is an example of the access destination, is described. It is assumed that the information terminal 111 has already logged in to the management server 10 at the start of the process illustrated in FIG. 10.

In step S1001, in response to a portal screen display operation by the user on the information terminal 111, the communication system 1 executes the processes step S1002 and thereafter.

In step S1002, in response to receiving the portal screen display operation by the user, the operation reception unit 504 of the information terminal 111 requests the application server 11 to display the portal screen.

In step S1003, the reception unit 301 of the application server 11 transmits a portal screen (Web UI) to the information terminal 111 in response to a request from the information terminal 111. In step S1004, the display control unit 503 of the information terminal 111 displays the portal screen.

In step S1005, in response to a selection by the user of a remote desktop connection (hereinafter referred to as RDP connection) from the portal screen, the communication system 1 executes the processes step S1006 and thereafter.

In step S1006, the operation reception unit 504 of the information terminal 111 acquires the location information indicating the location of the information terminal 111 by using the location information acquisition unit 505. Then, the operation reception unit 504 transmits a connection start request including the user ID for identifying the user, the service ID for identifying the remote desktop service provided by the information processing apparatus 101, acquired location information, and the like to the application server 11. The operation reception unit 504 may send a connection start request including authentication information such as an access token acquired at login or authentication information such as a cookie to the application server 11 instead of the user ID.

In step S1007, the acquisition unit 302 of the application server 11 acquires information indicating the time when the connection start request is received from the information terminal 111 and the location information included in the connection start request. In the following description, the time information and the location information acquired in this step may be referred to as the access information.

In step S1008, the restriction unit 303 of the application server 11 determines whether there is a usage restriction, using the acquired access information and setting information in which the range of access information to permit the use of service provided by the access destination terminal from the information terminal 111 is set in advance. For example, the restriction unit 303 executes a usage restriction determination process as illustrated in FIG. 12.

Figure 12:
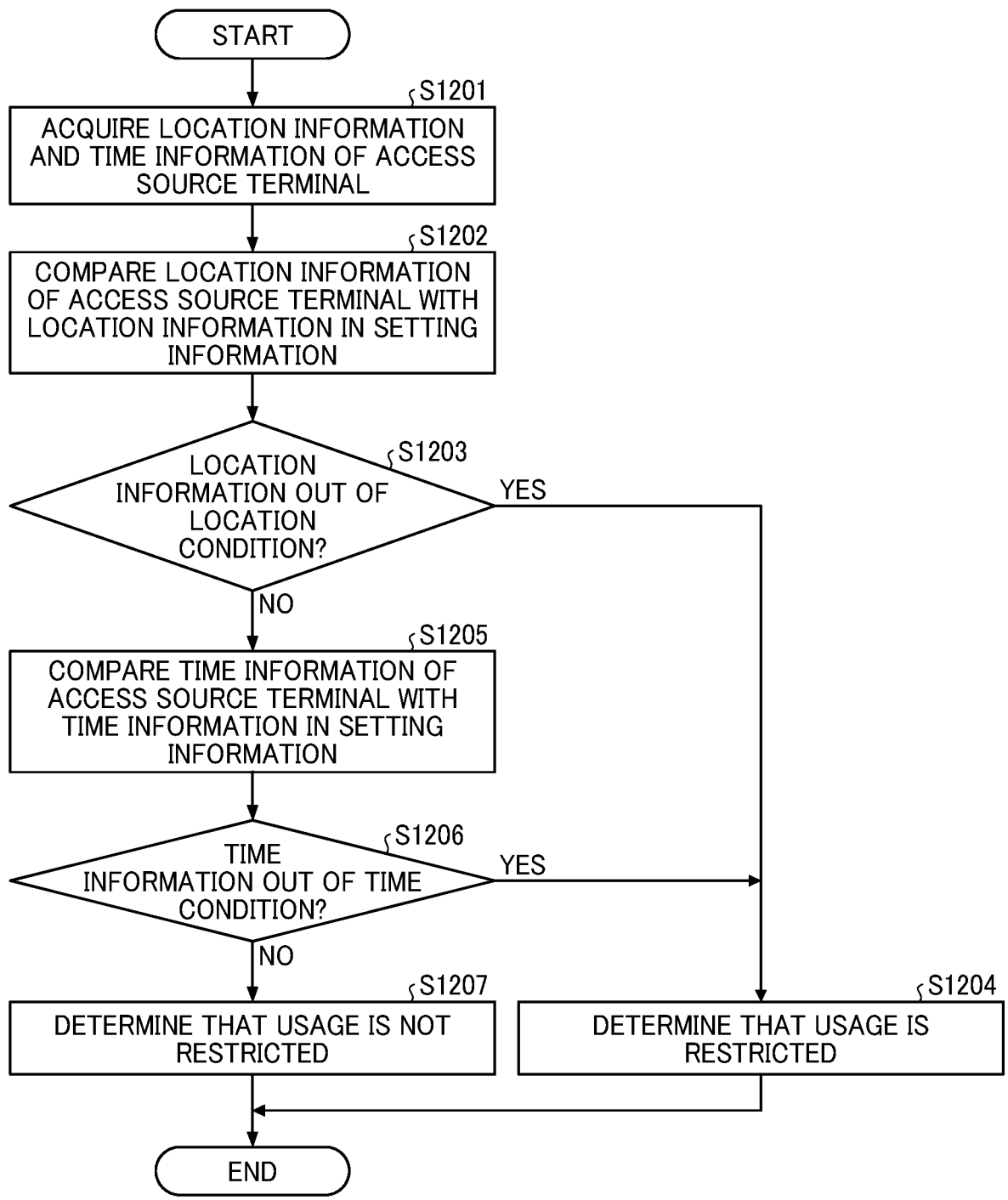
FIG. 12 is a flowchart illustrating a usage restriction determination process according to the first embodiment of the present disclosure.

FIG. 12 is a flowchart illustrating a usage restriction determination process according to the first embodiment of the present disclosure. This process is, for example, an example of the usage restriction determination process executed by the restriction unit 303 in step S1008 of FIG. 10.

In step S1201, the restriction unit 303 acquires the location information and the time information of the access source terminal (for example, the information terminal 111) from the acquisition unit 302.

In step S1202, the restriction unit 303 compares the location information of the access source terminal with the location condition of the setting information. For example, the setting information is assumed to be the policy list 901 as illustrated in FIG. 9A and the action list 902 as illustrated in FIG. 9B, the user ID included in the connection start request is assumed to be "u_30623016", and the service ID is assumed to be "s_89645095". In this case, the restriction unit 303 acquires, for example, the action ID "a_64499849" corresponding to the user ID "u_30623016" and the service ID "s_89645095" and acquires the location condition corresponding to the action ID "a_64499849" in the action list 902. Further, the restriction unit 303 compares the location information of the access source terminal with the location condition "(35.459, 139.388, 1)" corresponding to the action ID "a_64499849".

In step S1203, in response to a determination that the location information of the access source terminal is outside the range of the location condition "(35.459, 139.388, 1)", the restriction unit 303 shifts the process to step S1204. On the other hand, in response to a determination that the location information of the access source terminal is not outside the range of the location condition "(35.459, 139.388, 1)", the restriction unit 303 shifts the process to step S1205.

When the process proceeds to step S1204, the restriction unit 303 determines to restrict the usage.

On the other hand, when the process proceeds to step S1205, the restriction unit 303 compares the time information of the access source terminal with the time condition of the setting information. For example, the restriction unit 303 compares the time information of the access source terminal with the time condition "WEEKDAYS; 09:00-17:00" corresponding to the action ID "a_64499849" in the action list 902.

In step S1206, in response to a determination that the time information of the access source is out of the range of the time condition "WEEKDAYS; 09:00-17:00" the restriction unit 303 shifts the process to step S1204. On the other hand, in response to a determination that the time information of the access source is not outside the range of the time condition "WEEKDAYS; 09:00-17:00" the restriction unit 303 shifts the process to step S1207. When the process proceeds to step S1207, the restriction unit 303 determines that there is no usage restriction.

Returning to FIG. 10, the description of the process at the start of communication is continued.

In step S1008, in response to the determination that there is the usage restriction, the communication system 1 executes the process of steps S1101 and S1102. In step S1101, for example, the restriction unit 303 notifies the requesting information terminal 111 that the service provided by the access destination terminal cannot be used due to the usage restriction. In step S1102, the information terminal 111 and the application server 11 cancel the execution of the process after step S1009.

On the other hand, in step S1008, in response to the determination that there is no usage restriction, the communication system 1 executes the process step S1009 and thereafter.

In step S1009, the application server 11 may, for example, transmit the log information related to the process of steps S1006 to S1008 to the log management unit 313 of the service platform 12. Note that this process is optional and not essential.

In step S1010, the reception unit 301 of the application server 11 transmits a PC login screen for inputting login information for RDP connection (hereinafter referred to as PC login information) to the information terminal 111 in response to a request from the information terminal 111. In step S1011, the display control unit 503 of the information terminal 111 displays the PC login screen.

In step S1012, when the user inputs the PC login information on the login screen, the communication system 1 executes the process step S1013 and thereafter.

In step S1013, the operation reception unit 504 of the information terminal 111 transmits an RDP connection request requesting a remote desktop connection to the application server 11.

In step S1014, when the reception unit 301 of the application server 11 receives the RDP connection request from the information terminal 111, the communication control unit 304 generates a session ID for identifying the session.

Figure 11:
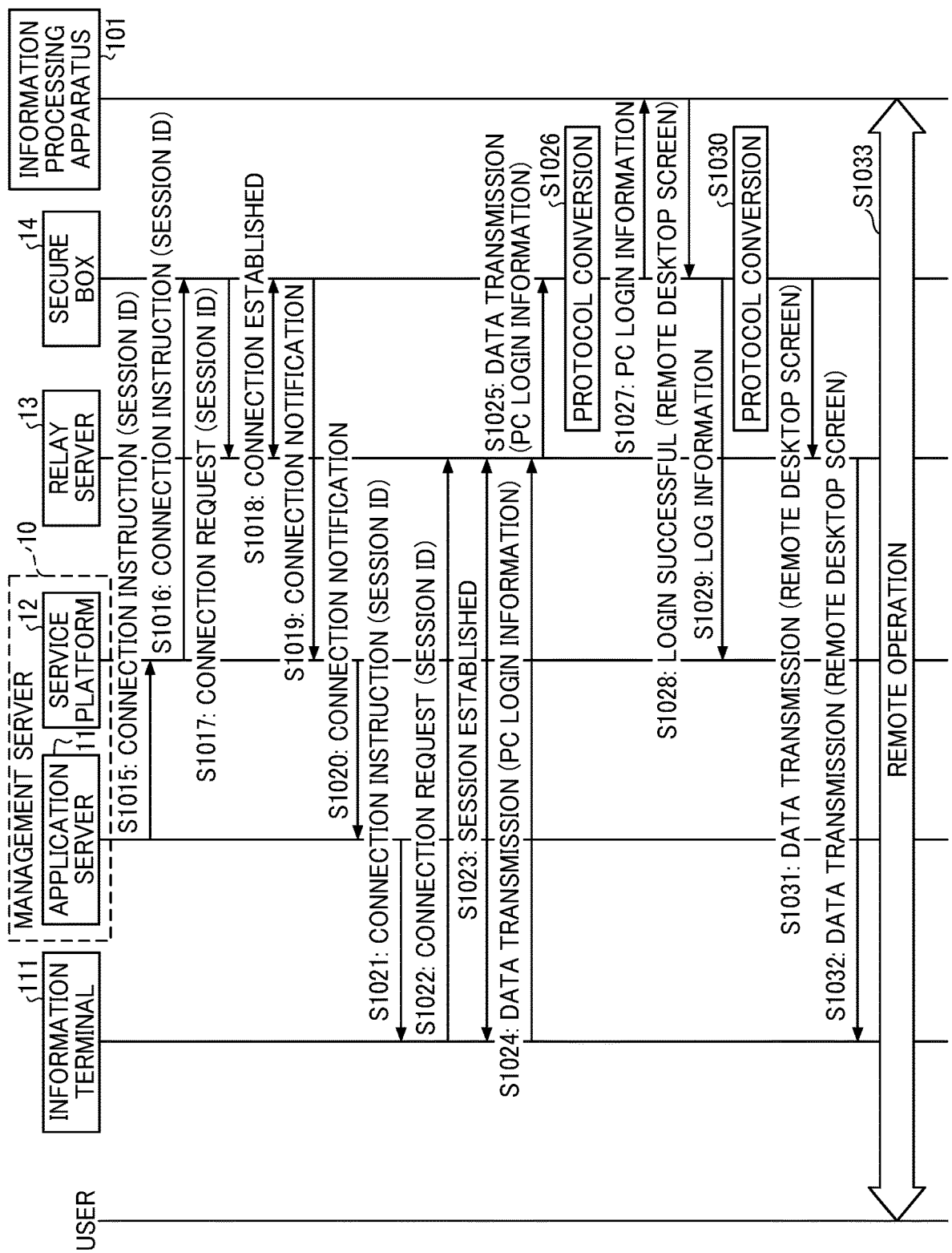
FIG. 11 is a second sequence diagram illustrating another example of the process at the start of communication according to the first embodiment of the present disclosure.

Following the above processing, in steps S1015 and S1016 of FIG. 11, the communication control unit 304 of the application server 11 issues a connection instruction to the relay server 13 including the generated session ID to the secure box 14 through the device management unit 312 of the service platform 12.

In step S1017, the encrypted communication unit 403 of the secure box 14 transmits a connection request including the session ID notified from the management server 10 to the relay server 13 through the first communication unit 401.

In step S1018, the connection management unit 331 of the relay server 13 establishes a session for performing the first encrypted communication 3 with the encrypted communication unit 403 of the secure box 14.

In steps S1019 and S1020, the encrypted communication unit 403 of the secure box 14 notifies the application server 11 of the connection notification indicating that the connection is made to the relay server 13 through the device management unit 312 of the service platform 12.

In step S1021, the communication control unit 304 of the application server 11 transmits the connection instruction including the session ID generated in step S1014 to the information terminal 111.

In step S1022, the encrypted communication unit 502 of the information terminal 111 transmits the connection request including the session ID notified from the application server 11 to the relay server 13.

In step S1023, the connection management unit 331 of the relay server 13 establishes a session for performing the second encrypted communication 4 with the encrypted communication unit 502 of the information terminal 111. As a result, the information terminal 111 and the secure box 14 participate in the same session provided by the relay server 13 and send and receive data to and from each other by encrypted communication (for example, wss).

Figure 10:
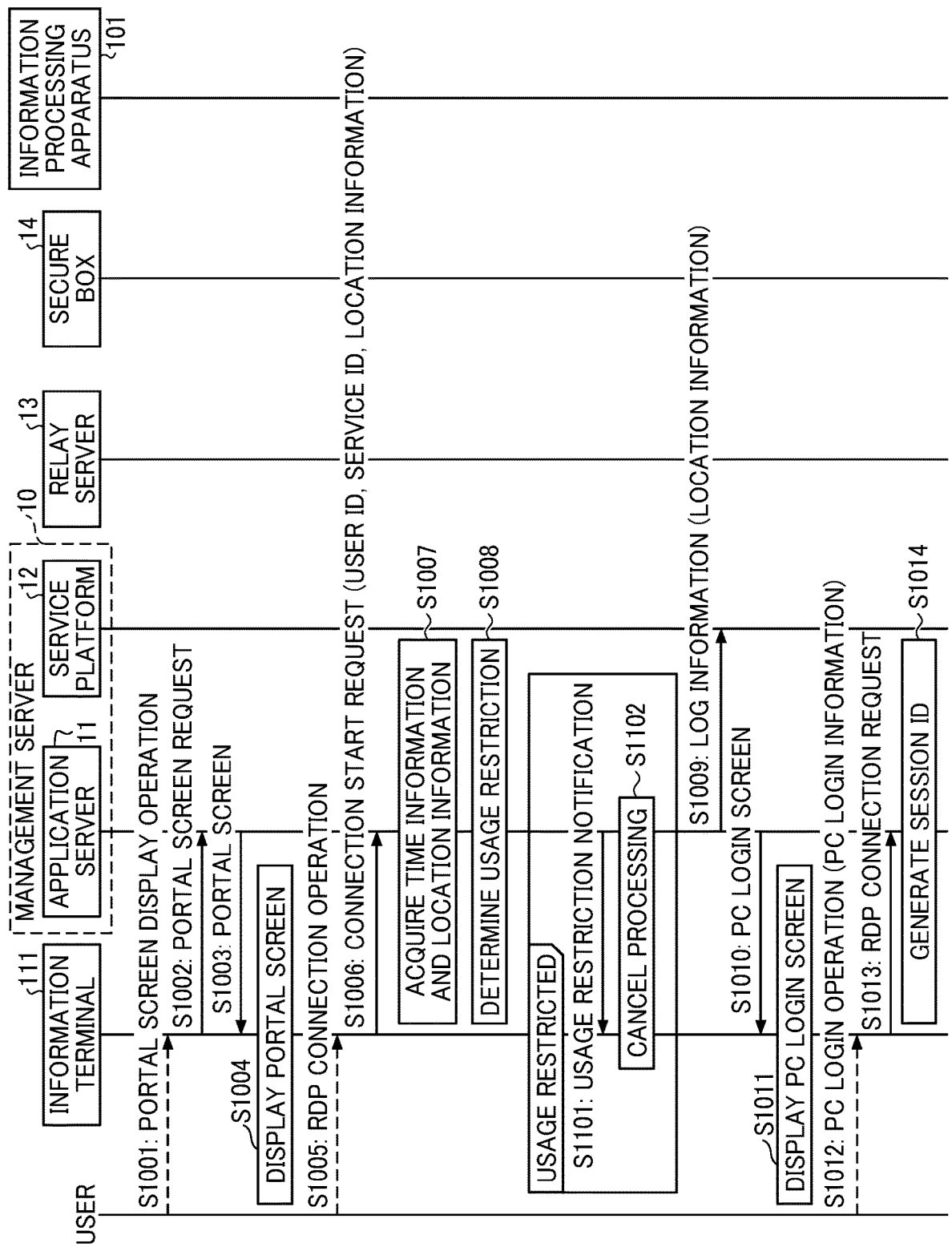
FIG. 10 is a first sequence diagram illustrating an example of a process at a start of communication according to a first embodiment of the present disclosure.

In steps S1024 and S1025, the information terminal 111 transmits, for example, the PC login information received in step S1012 of FIG. 10 to the secure box 14 through the relay server 13.

In step S1026, the conversion unit 404 of the secure box 14 performs protocol conversion of the PC login information received from the information terminal 111 into the PC login information in RDP format. As an example of specific processing, in response to receiving the PC login information from the information terminal 111, the encrypted communication unit 403 of the secure box 14 activates the conversion unit 404 corresponding to the RDP connection. Further, the encrypted communication unit 403 sets the information terminal 111 and the information processing apparatus 101 that provides the remote desktop service, to communicate through the activated conversion unit 404. As a result, the conversion unit 404 converts, for example, the data in the HyperText Transfer Protocol (HTTP) format or the like received from the information terminal 111 into the data in the RDP format and transmits the data to the information processing apparatus 101. Further, the conversion unit 404 converts the RDP format data received from the information processing apparatus 101 into data in the HTTP format or the like and transmits the data to the information terminal 111 (relay server 13).

In step S1027, the conversion unit 404 of the secure box 14 transmits the PC login information converted into the RDP format to the information processing apparatus 101. Here, it is assumed that the user of the information terminal 111 is a legitimate user of the remote desktop service provided by the information processing apparatus 101 and the login is successful.

In step S1028, the remote desktop service provided by the information processing apparatus 101 transmits information indicating that the login was successful, the remote desktop screen, and the like to the secure box 14 in the RDP format.

In step S1029, the secure box 14 transmits, for example, log information regarding the processing of steps S1025 to S1028 to the log management unit 313 of the service platform 12.

In step S1030, the conversion unit 404 of the secure box 14 converts the remote desktop screen received from the information processing apparatus 101 into image data in a format that can be displayed by the information terminal 111.

In steps S1031 and S1032, the encrypted communication unit 403 of the secure box 14 transmits the image data converted by the conversion unit 404 to the information terminal 111 through the relay server 13.

After the above processing, in step S1033, the user uses the remote desktop service provided by the information processing apparatus 101, for example, by using the web browser of the information terminal 111 or the like.

As described above, according to the first embodiment, in the communication system in which various services are used by remotely accessing one or more access destination terminals from a mobile access source terminal, the use of each service can be appropriately restricted at the start of communication.

In a second embodiment, an example of a process in which the use of the service is restricted during communication between the information terminal 111 and the information processing apparatus 101, after the processing of FIGS. 10 to 12, is described. Note that the second embodiment can be applied in combination with the first embodiment.

Figure 13:
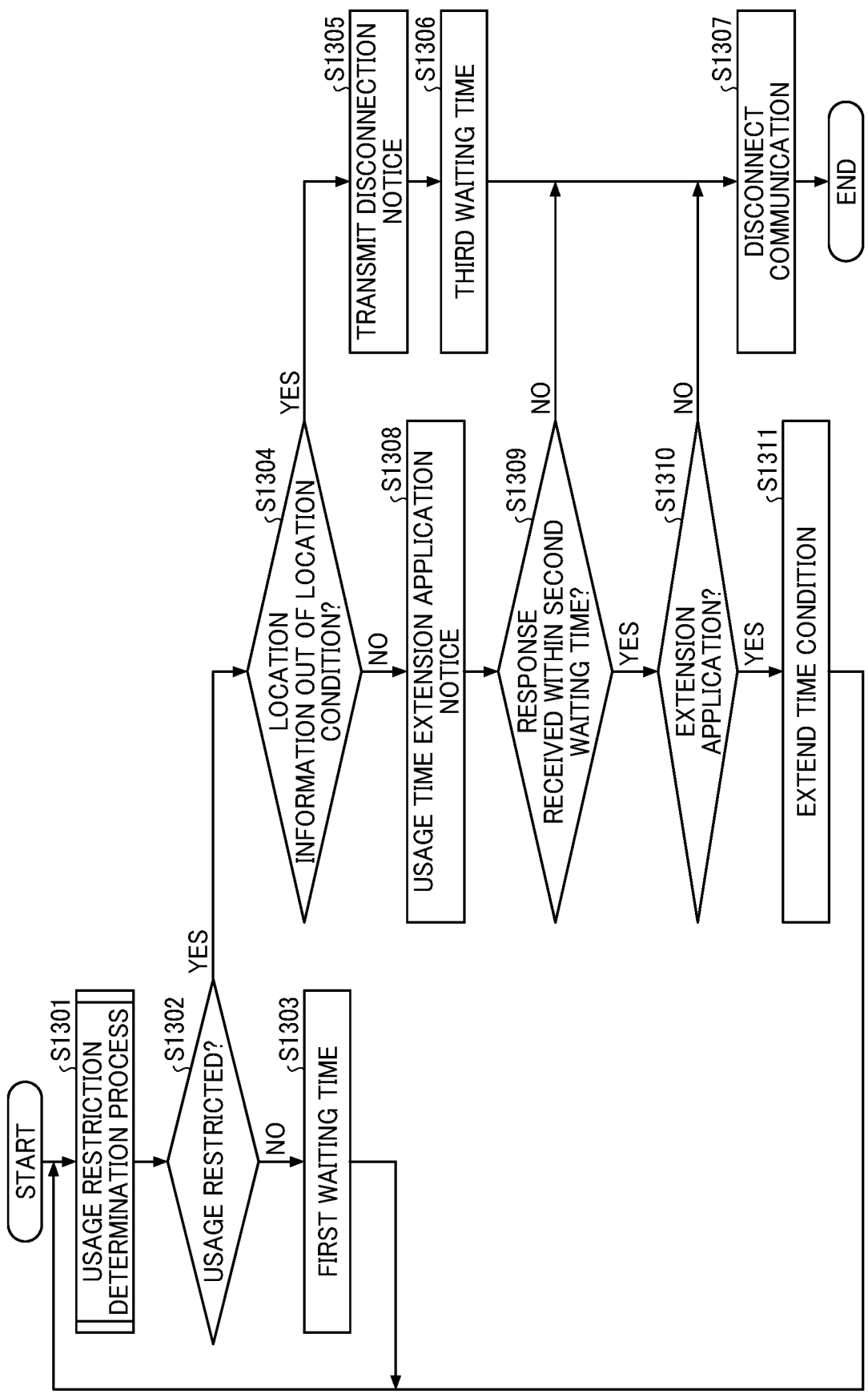
FIG. 13 is a flowchart illustrating an example of a process during communication according to a second embodiment of the present disclosure.

FIG. 13 is a flowchart illustrating an example of a process during communication according to the second embodiment. FIG. 13 illustrates an example of the process executed by the management server 10 during communication between the access source terminal and the access destination terminal.

In step S1301, the restriction unit 303 of the application server 11 executes the usage restriction determination process as illustrated in FIG. 12. Here, in step S1201 of FIG. 12, the acquisition unit 302 of the application server 11 may acquire the location information of the information terminal 111 by, for example, transmitting a location information acquisition request to the web browser of the information terminal 111. Alternatively, the acquisition unit 302 may acquire the location information of the information terminal 111 periodically transmitted by the web browser of the information terminal 111.

In response to a determination in step S1302 that there is a usage restriction in the usage restriction determination process, the restriction unit 303 shifts the process to step S1304. In response to a determination that there is no usage restriction in the usage restriction determination process, the restriction unit 303 shifts the process to step S1303.

In step S1303, the restriction unit 303 returns the process to step S1301 after waiting for a first waiting time set in advance (for example, about 1 minute to 15 minutes).

In step S1304, the restriction unit 303 determines whether the location information of the information terminal 111 is outside the range of the location condition of the setting information and in response to a determination that the location information of the information terminal 111 is outside the range of the location condition of the setting information, the process is shifted to step S1305. On the other hand, in response to a determination that the location information of the information terminal 111 is not outside the range of the location condition of the setting information, the restriction unit 303 shifts the process to step S1308.

In step S1305, the restriction unit 303 notifies the user who uses the information terminal 111 of a disconnection notice indicating that the communication will be disconnected within time set in advance. For example, the restriction unit 303 may display a disconnection notice screen (or disconnection notice message) or the like indicating that the communication is disconnected within time set in advance on the web browser or the like of the information terminal 111. Alternatively, the restriction unit 303 may send an e-mail, a chat, or an SMS indicating that the communication is disconnected within time set in advance to the user who uses the information terminal 111.

In step S1306, the restriction unit 303 shifts the process to step S1307 after waiting for a third waiting time set in advance (for example, about 1 to 5 minutes).

In step S1307, the restriction unit 303 disconnects the communication between the information terminal 111 and the information processing apparatus 101. For example, the restriction unit 303 instructs the information terminal 111, the secure box 14, the relay server 13, and the like to disconnect the communication.

On the other hand, when the process proceeds from step S1304 to step S1308, the extension processing unit 306 of the application server 11 notifies the user of the information terminal 111 that an application for extension of the usage time is required in order to continue using the service. This notification may be, for example, to display on the information terminal 111, a reception screen for accepting an extension operation or an end operation of the usage time or a notification to the user by using e-mail, chat, SMS, or the like.

In step S1309, in response to a reply to the notification within a second waiting time set in advance (for example, about 1 minute to 5 minutes), the extension processing unit 306 shifts the process to step S1310. On the other hand, in response to not receiving the reply to the notification within the second waiting time, the extension processing unit 306 shifts the process to step S1307. The reply to the notification may be, for example, an operation on the reception screen displayed on the information terminal 111, a reply to e-mail, chat, SMS, or an operation such as an access to a link destination.

In step S1310, the extension processing unit 306 shifts the process to step S1311 in response to an extension request by the user. On the other hand, when the response to the notification is not the extension request by the user, the extension processing unit 306 shifts the process to step S1307.

In step S1311, the extension processing unit 306 temporarily extends the time condition set in the setting information and returns the process to step S1301. For example, the extension processing unit 306 extends the time condition set in the setting information by time set in advance (for example, about 15 to 60 minutes).

In the communication system 1 in which various services are used by remotely accessing one or more access destination terminals from the mobile access source terminal by the above process, the use of each service can be appropriately restricted even during the communication.

Further, when the time information of the access source terminal such as the information terminal 111 is out of the range of the time condition of the setting information, by extending the time condition according to the extension application, adverse effects on business can be reduced.

Figure 14:
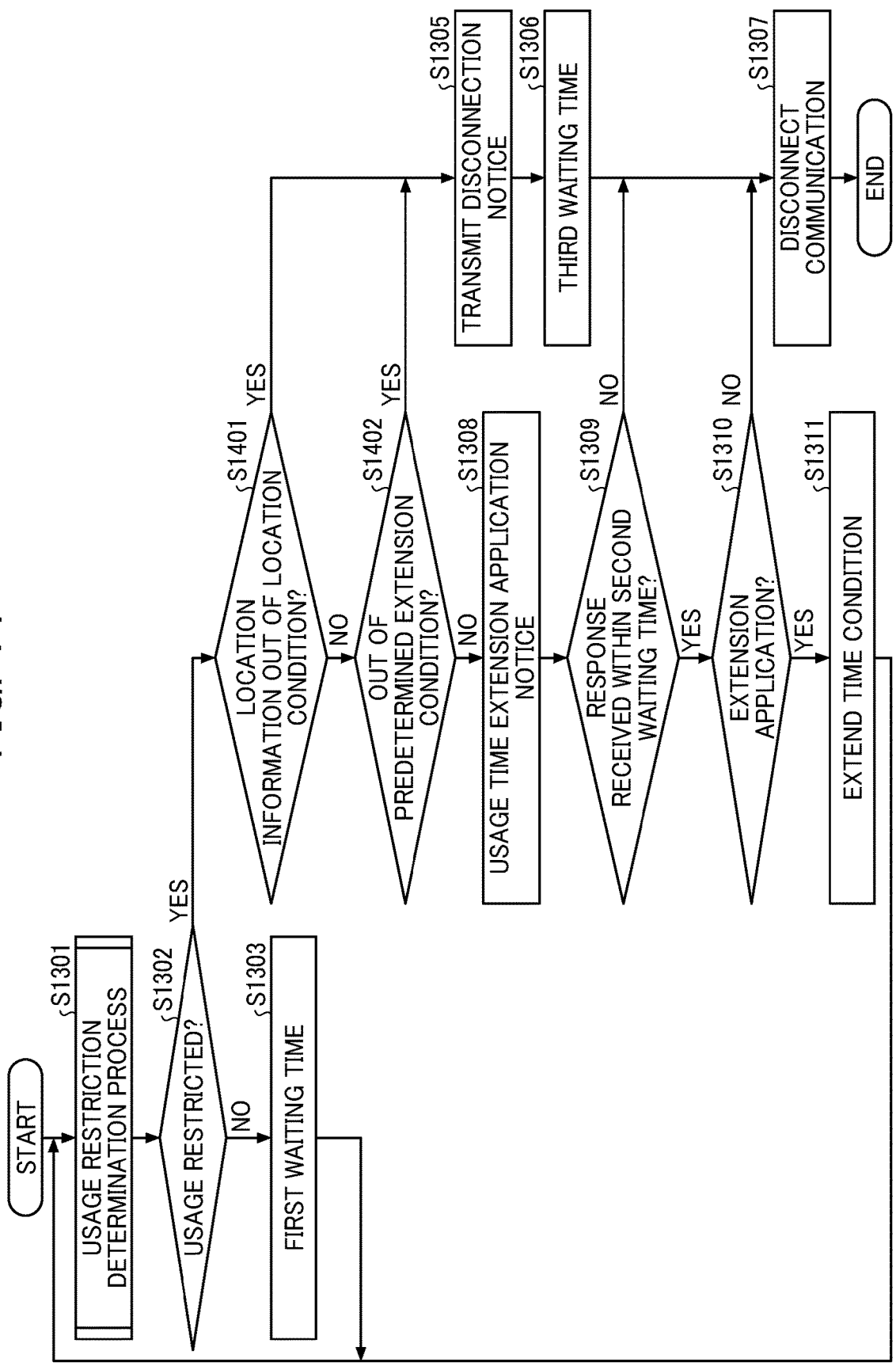
FIG. 14 is a flowchart illustrating another example of a process during communication according to the second embodiment of the present disclosure.

FIG. 14 is a flowchart illustrating another example of the process during communication according to the second embodiment of the present disclosure. FIG. 14 illustrates another example of the process executed by the management server 10 during communication between the access source terminal and the access destination terminal. Of the processes illustrated in FIG. 14, the processes of steps S1301 to S1303 and S1305 to S1311 are the same as the processes during communication described with reference to FIG. 13. The differences from the processing described with reference to FIG. 13 is mainly described in the following.

In step S1401, the restriction unit 303 determines whether the location information of the information terminal 111 is outside the range of the location condition of the setting information and in response to a determination that the location information of the information terminal 111 is outside the range of the location condition of the setting information, the process is shifted to step S1305. On the other hand, in response to a determination that the location information of the information terminal 111 is not outside the range of the location condition of the setting information, the restriction unit 303 shifts the process to step S1402.

In step S1402, the extension processing unit 306 determines whether the time information is within the range of the extension condition set in advance. As an example, the administrator or the like sets in advance, operational time (for example, 9:00 to 17:00 on weekdays) and extendable time (for example, 17:00 to 19:00 on weekdays) in the time condition of the setting information. In this case, the extension processing unit 306 determines that the time information of the information terminal 111 is outside the range of the extension condition set in advance when the time information is outside the range of 17:00 to 19:00 on weekdays. As another example, the extension processing unit 306 may determine that the time information is out of the range of the extension condition set in advance when the number of extensions reaches upper limit of the number of extensions set in advance.

In response to the determination that the time information is out of the range of the extension condition set in advance, the extension processing unit 306 shifts the process to step S1305. On the other hand, in response to the determination that the time information is not outside the range of the extension condition set in advance, the extension processing unit 306 shifts the process to step S1308.

By the above process, the communication system 1 can restrict the extension condition that can be extended by the user.

Figure 15:
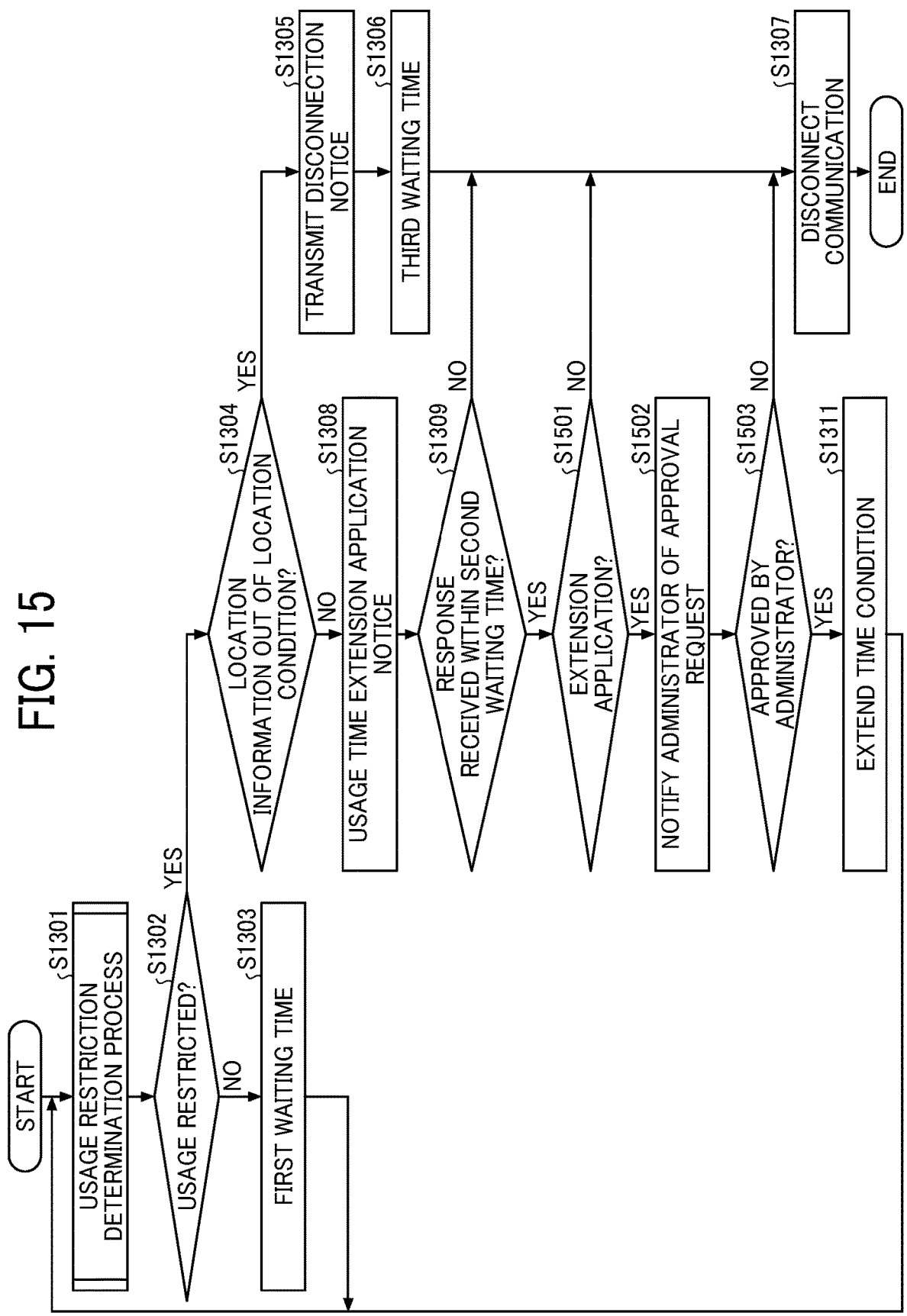
FIG. 15 is a flowchart illustrating an example of a process during communication according to a third embodiment of the present disclosure.

FIG. 15 is a flowchart illustrating an example of a process during communication according to a third embodiment of the present disclosure. FIG. 15 illustrates another example of the process executed by the management server 10 during communication between the access source terminal and the access destination terminal. Of the processes illustrated in FIG. 15, the processes of steps S1301 to S1309 and S1311 are the same as the processes during communication described with reference to FIG. 13. The differences from the processing described in FIG. 13 is mainly described in the following.

In step S1501, in response to receiving an extension application from the user, the extension processing unit 306 shifts the process to step S1502. On the other hand, when the response to the notification is not the extension request by the user, the extension processing unit 306 shifts the process to step S1307.

In step S1502, the extension processing unit 306 notify the administrator or the like, an approval request requesting approval for an application for extension of time condition by the user who uses the information terminal 111. The extension processing unit 306 may notify the approval request by using an external service of the communication system 1 such as e-mail, chat, or SMS, or may notify the management terminal 5 or the like.

In step S1503, in response to receiving approval by the administrator within time set in advance, the extension processing unit 306 shifts the process to step S1311. On the other hand, in response to not receiving approval by the administrator within time set in advance, the extension processing unit 306 shifts the process to step S1307. The approval by the administrator may be, for example, an approval operation by the management terminal 5 or the like, a reply to e-mail, chat, SMS, or the like, or an approval operation by accessing a link destination, or the like.

By the above process, the communication system 1 can request the approval by the administrator or the like for the application for extension of the time condition by the user.

Figure 16:
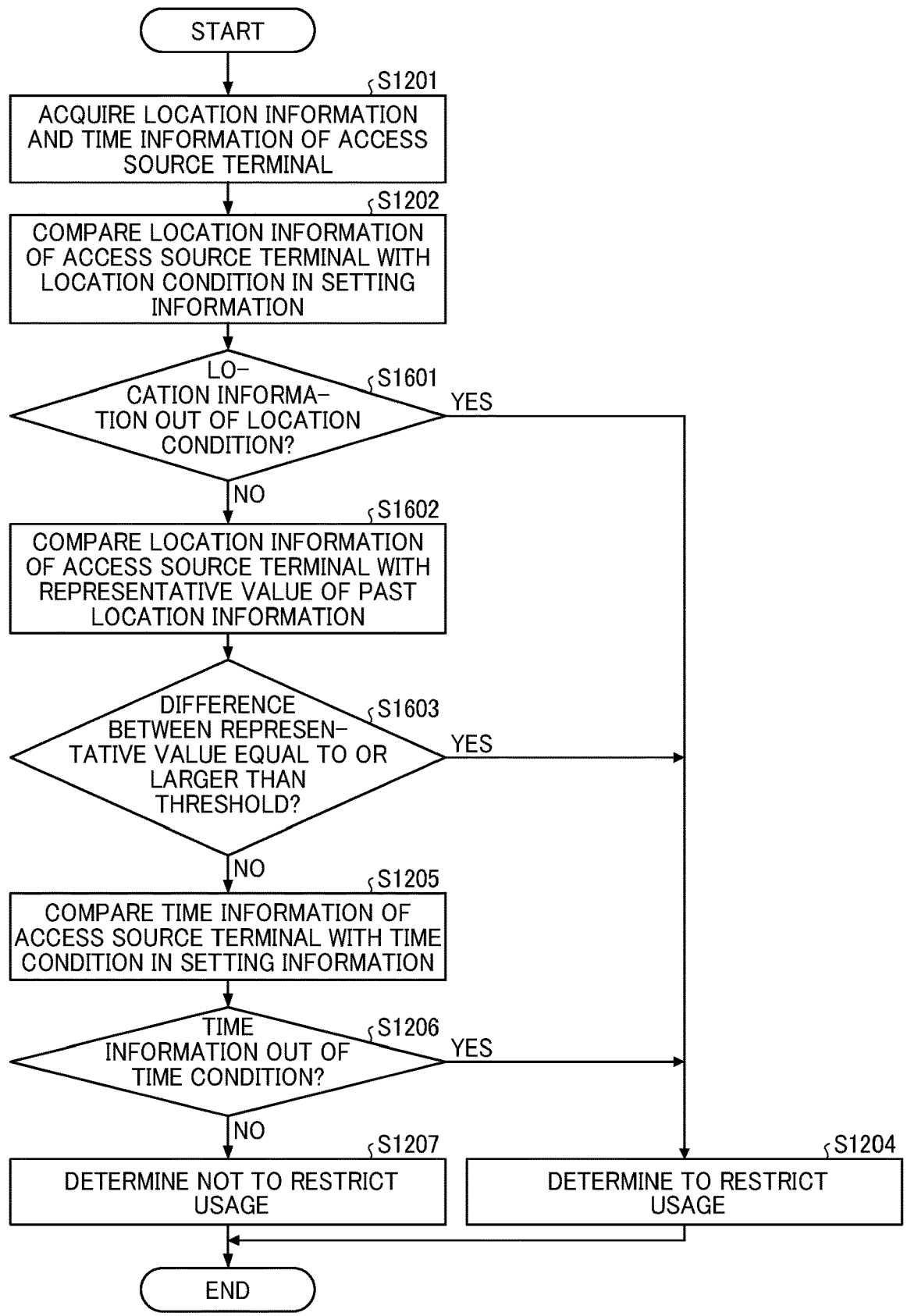
FIG. 16 is a flowchart illustrating an example of a usage restriction determination process according to a fourth embodiment of the present disclosure.

FIG. 16 is a flowchart illustrating an example of a usage restriction determination process according to a fourth embodiment of the present disclosure. This flowchart illustrates another example of the usage restriction determination process described with reference to FIG. 12. Of the processes illustrated in FIG. 16, the processes of steps S1201, S1202, and S1204 to S1207 are the same as the usage restriction determination processes described with reference to FIG. 12. The differences from the process described with reference to FIG. 12 is mainly described in the following.

In step S1601, in response to a determination that the location information of the access source terminal is outside the range of the location condition of the setting information, the restriction unit 303 shifts the process to step S1204. On the other hand, in response to a determination that the location information of the access source terminal is not outside the range of the location condition of the setting information, the restriction unit 303 shifts the process to step S1602.

In step S1602, the restriction unit 303 compares the location information of the access source terminal with the representative value (for example, an average value, a median value, a maximum value, etc.) calculated from the history of the location information of the access source terminal. The restriction unit 303 may store, for example, the history of the location information of the access source terminal acquired in step S1201 of FIG. 16 in the storage unit 308 or the like for each access source terminal. Alternatively, the restriction unit 303 may use, for example, the log information and the like transmitted by the application server 11 to the log management unit 313 of the service platform 12, in step S1009 of FIG. 10 as a history of the location information of the access source terminal.

In step S1603, in response to a determination that the difference between the location information of the access source terminal and the representative value of the history of the location information is equal to or more than a threshold value, the restriction unit 303 shifts the process to step S1204. On the other hand, in response to a determination that the difference between the location information of the access source terminal and the representative value of the history of the location information is not more than the threshold value, the restriction unit 303 shifts the process to step S1205. Here, it is assumed that the threshold value is set in advance, for example, as a value for determining that the location of the access source terminal deviates from the location where the access source terminal is always operating.

By the above process, for example, even when the location condition set in the setting information is widely set, for example, within a business establishment or an entire floor, the use of the service can be restricted when the location of the access source terminal changes significantly. Further, by the above processing, possibility of unauthorized access can be reduced, for example, even when the access source terminal disguises the location information. The fourth embodiment can be applied to the first to third embodiments.

As described above, according to each embodiment of the present disclosure, in the communication system in which various services are used by remotely accessing one or more access destination terminals from the mobile access source terminal, the use of each service can be appropriately restricted.

The apparatuses or devices described in one or more embodiments are just one example of plural computing environments that implement the one or more embodiments disclosed herein. In some embodiments, management server 10 includes multiple computing devices, such as a server cluster. The plurality of computing devices is configured to communicate with one another through any type of communication link, including a network, shared memory, etc., and perform the processes disclosed herein. Similarly, the relay server 13 can include a plurality of computing devices configured to communicate with each other.

Each functional configuration of the management server 10 may be integrated into one server or may be divided into a plurality of devices. Further, at least a part of each functional configuration of the application server 11 may be included in the service platform 12, the relay server 13, or the like. Further, at least a part of the functional configuration of the service platform 12 may be included in the application server 11, the relay server 13, or the like, or an external service of the communication system 1 may be used.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A communication system comprising:
circuitry configured to:
   communicate with an access source terminal connected to a first network, a communication apparatus and one or more access destination terminals each connected to a second network different from the first network, the one or more access destination terminals being configured to provide a service by remote access;
   in response to a request from the access source terminal to use the service provided by the one or more access destination terminals, acquire access information including location information indicating location of the access source terminal and time information indicating usage time of the service;
   in response to a start of the use of the service by the access source terminal, acquire the access information including the location information and the time information of the access source terminal;
   restrict use of the service by the access source terminal based on the access information and setting information, the setting information previously setting a range of the access information for permitting the use of the service provided by the one or more access destination terminals by the access source terminal; and
   in response to determination that a part or all of the access information is outside a range of the access information set in the setting information, restrict the use of the service by the access source terminal.

2. The communication system of claim 1, wherein
the service provided by the one or more access destination terminals includes a plurality of services, and
the setting information is set for each of the plurality of services provided by the one or more access destination terminals.

3. The communication system of claim 1, wherein
the circuitry is further configured to:
acquire the access information including the location information and the time information of the access source terminal, while the access source terminal is using the service; and
in response to determination that a part or all of the access information is outside the range of the access information set in the setting information, restrict the use of the service by the access source terminal.

4. The communication system of claim 3, wherein
in response to determination to restrict the use of the service by the access source terminal while the access source terminal is using the service, the circuitry is further configured to notify the access source terminal that the use of the service is restricted.

5. The communication system of claim 3, wherein
in response to determination that the location information included in the acquired access information is within the range of the location information included in the access information set in the setting information and the time information included in the acquired access information is outside the range of the time information included in the access information set in the setting information, the circuitry is further configured to:
request the access source terminal to apply for an extension of usage time; and
in response to an extension application from the access source terminal, execute an extension process of the usage time according to the extension application.

6. The communication system of claim 1, wherein
the circuitry is further configured to:
store in one or more memories, history of the location information of the access source terminal; and
in response to determination that a difference between a representative value of the history of the location information stored in the one or more memories and the location information of the access source terminal is equal to or larger than a threshold value, restrict the use of the service by the access source terminal.

7. The communication system of claim 1 comprising:
a management server, wherein the circuitry is at least partly disposed on the manager server, the management server being configured to:
acquire the location information of the access source terminal from the access source terminal; and
acquire the time information indicating usage time of the service by the access source terminal.

8. The communication system of claim 1, further comprising:
the access source terminal;
the communication apparatus; and
the one or more access destination terminals.

9. A communication management method executed by a management server that manages communication from an access source terminal connected to a first network, through a communication apparatus connected to a second network different from the first network, to remotely access a service provided by one or more access destination terminals connected to the second network, the method comprising:
in response to a request from the access source terminal to use the service provided by the one or more access destination terminals, acquiring access information including location information indicating a location of the access source terminal and time information indicating usage time of the service provided by the one or more access destination terminals;
in response to a start of the use of the service by the access source terminal, acquire the access information including the location information and the time information of the access source terminal;
restricting use of the service provided by the one or more access destination terminals based on the access information and setting information, the setting information previously setting a range of the access information for permitting the use of the service provided by the one or more access destination terminals by the access source terminal; and
in response to determination that a part or all of the access information is outside the range of the access information set in the setting information, restrict the use of the service by the access source terminal.

10. A non-transitory recording medium storing a plurality of instructions which, when executed by one or more processors, causes the processors to perform a communication management method executed by a management server that manages communication from an access source terminal connected to a first network, through a communication apparatus connected to a second network different from the first network, to remotely access a service provided by one or more access destination terminals connected to the second network, the method comprising:
in response to a request from the access source terminal to use the service provided by the one or more access destination terminals, acquiring access information including location information indicating a location of the access source terminal and time information indicating usage time of the service provided by the one or more access destination terminals;
in response to a start of the use of the service by the access source terminal, acquire the access information including the location information and the time information of the access source terminal;
restricting use of the service provided by the one or more access destination terminals using the access information and setting information, the setting information previously setting a range of the access information for permitting the use of the service provided by the one or more access destination terminals by the access source terminal; and
in response to determination that a part or all of the access information is outside the range of the access information set in the setting information, restrict the use of the service by the access source terminal.

* * * * *